US012291003B2

(12) United States Patent
Mohan et al.

(10) Patent No.: US 12,291,003 B2
(45) **Date of Patent: *May 6, 2025**

(54) METHOD AND SYSTEM FOR FORMING A CONTAINER WITH INSULATING FEATURES

(71) Applicants: Debra Williams, West Bend, WI (US); Graphic Packaging International, LLC, Atlanta, GA (US)

(72) Inventors: Kosaraju Mohan, Menomonee Falls, WI (US); Kyle Baird, Milwaukee, WI (US); Jozef Milewski, Richfield, WI (US); James Vogt, West Bend, WI (US); Ryan Kaestner, Milwaukee, WI (US); Mark Baldwin, Milwaukee, WI (US); John Best, Downingtown, PA (US); Robert Koupeny, Sussex, WI (US)

(73) Assignee: Graphic Packaging International, LLC, Atlanta, GA (US)

( * ) Notice: Subject to any disclaimer, the term of this patent is extended or adjusted under 35 U.S.C. 154(b) by 65 days.

This patent is subject to a terminal disclaimer.

(21) Appl. No.: 18/135,854

(22) Filed: Apr. 18, 2023

(65) Prior Publication Data

US 2023/0249426 A1 Aug. 10, 2023

Related U.S. Application Data

(63) Continuation-in-part of application No. 17/723,802, filed on Apr. 19, 2022, now Pat. No. 11,945,641,
(Continued)

(51) Int. Cl.

| | |
|---|---|
| ***B31B 50/62*** | (2017.01) |
| ***B31B 50/02*** | (2017.01) |

(Continued)

(52) U.S. Cl.
CPC .......... *B31B 50/626* (2017.08); *B31B 50/024* (2017.08); *B65D 3/06* (2013.01);
(Continued)

(58) Field of Classification Search
CPC .. B65D 3/22; B65D 81/3874; B65D 81/3881; B65D 81/3886; B65D 1/265; B65D 81/3869; B31B 50/62; B31B 2120/40
See application file for complete search history.

(56) References Cited

U.S. PATENT DOCUMENTS

| | | | |
|---|---|---|---|
| 21,955 | A | 11/1858 | Grosholz |
| 1,771,765 | A | 7/1930 | Benson |

(Continued)

FOREIGN PATENT DOCUMENTS

| | | |
|---|---|---|
| CA | 2814820 | 11/2013 |
| DE | 42 2 6313 | 2/1994 |

(Continued)

OTHER PUBLICATIONS

International Search Report and Written Opinion for US/PCT/2019/027117 dated Jul. 29, 2019.

(Continued)

*Primary Examiner* — Shawn M Braden
(74) *Attorney, Agent, or Firm* — Womble Bond Dickinson (US) LLP

(57) ABSTRACT

A system, apparatus, process, or machine for forming a container for containing a cold fluid. The container includes a sidewall construct that includes an inner sidewall extending at least partially around an interior of the container, an outer sleeve attached to the inner sidewall, and a cavity defined between the inner sidewall and the outer sleeve. The container also includes a closed bottom defining a bottom of the interior of the container, and insulating features that include the cavity and a plurality of annular bands, each
(Continued)

annular band of the plurality of annular bands includes a spacer that extends in the cavity from the inner sidewall to the outer sleeve. Adjacent bands define a respective pocket of a plurality of pockets in the cavity such that the insulating features maintain a desired temperature of the cold fluid.

20 Claims, 29 Drawing Sheets

Related U.S. Application Data which is a continuation-in-part of application No. 16/382,265, filed on Apr. 12, 2019, now Pat. No. 11,401,100, said application No. 17/723,802 is a continuation-in-part of application No. 16/382,270, filed on Apr. 12, 2019, now Pat. No. 11,738,932.

(60) Provisional application No. 62/674,834, filed on May 22, 2018, provisional application No. 62/657,246, filed on Apr. 13, 2018, provisional application No. 62/794,131, filed on Jan. 18, 2019, provisional application No. 63/333,710, filed on Apr. 22, 2022.

(51) Int. Cl.

| | |
|---|---|
| ***B65D 3/06*** | (2006.01) |
| ***B65D 3/14*** | (2006.01) |
| ***B65D 81/38*** | (2006.01) |
| *B31B 105/00* | (2017.01) |
| *B31B 110/10* | (2017.01) |
| *B31B 120/40* | (2017.01) |

(52) U.S. Cl.

CPC ........... *B65D 3/14* (2013.01); *B65D 81/3869* (2013.01); *B31B 2105/0022* (2017.08); *B31B 2110/10* (2017.08); *B31B 2120/40* (2017.08)

(56) References Cited

U.S. PATENT DOCUMENTS 2,266,828 A 12/1941 Sykes
2,675,954 A 4/1954 Vogel
3,079,027 A 2/1963 Edwards
3,082,900 A 3/1963 Goodman
3,169,689 A 2/1965 Schwartz
3,208,631 A 9/1965 Edwards
3,456,860 A 7/1969 Janninck
3,526,316 A 9/1970 Kalogris
3,580,468 A 5/1971 McDevitt
3,675,954 A 7/1972 Konig
4,007,670 A 2/1977 Albano et al.
4,049,122 A 9/1977 Maxwell
4,231,476 A 11/1980 Compton et al.
4,261,501 A 4/1981 Watkins et al.
4,435,344 A 3/1984 Iioka
5,145,107 A 9/1992 Silver et al.
5,205,473 A 4/1993 Coffin, Sr.
5,226,585 A 7/1993 Varano
5,326,019 A 7/1994 Wolff
5,425,497 A 6/1995 Sorensen
5,460,323 A 10/1995 Titus
5,469,983 A 11/1995 Yawata
5,524,817 A 6/1996 Meier et al.
5,542,599 A 8/1996 Sobol
5,547,124 A 8/1996 Mueller
5,628,453 A * 5/1997 MacLaughlin ........ B65D 1/265 220/739
5,667,135 A 9/1997 Schaefer
5,685,480 A 11/1997 Choi
5,697,550 A 12/1997 Varano et al.
5,713,512 A 2/1998 Barrett
5,746,372 A 5/1998 Spence
5,752,653 A 5/1998 Razzaghi
5,769,311 A 6/1998 Morita et al.
5,772,111 A 6/1998 Kirsch
5,775,577 A 7/1998 Titus
5,794,843 A 8/1998 Sanchez
5,826,786 A 10/1998 Dickert
5,839,653 A 11/1998 Zadravetz
5,842,633 A 12/1998 Nurse
5,902,669 A 5/1999 Steinhardt et al.
5,950,917 A 9/1999 Smith
5,952,068 A 9/1999 Neale
5,964,400 A 10/1999 Varano et al.
5,975,336 A 11/1999 Hart
6,068,182 A 5/2000 Tokunaga
6,085,970 A 7/2000 Sadlier
6,109,518 A 8/2000 Mueller et al.
6,129,653 A 10/2000 Fredricks et al.
6,152,363 A 11/2000 Rule, Jr.
6,193,098 B1 2/2001 Mochizuki et al.
6,196,454 B1 3/2001 Sadlier
6,253,995 B1 7/2001 Blok et al.
6,265,040 B1 7/2001 Neale et al.
6,422,456 B1 7/2002 Sadlier
6,598,786 B1 7/2003 Guo
6,663,926 B1 12/2003 Okushita et al.
7,100,770 B2 9/2006 D'Amato
7,281,649 B2 10/2007 Pyper, Jr.
7,717,325 B2 5/2010 Puls et al.
8,061,551 B2 11/2011 Matlovich
8,146,797 B2 4/2012 D'Amato
8,360,263 B2 1/2013 D'Amato
8,608,018 B2 12/2013 Babinsky et al.
9,102,461 B2 8/2015 Leser et al.
9,266,660 B2 2/2016 Cai
9,290,312 B2 3/2016 Brown
9,648,969 B2 5/2017 Fu et al.
9,783,359 B2 10/2017 D'Amato
10,398,242 B2 9/2019 Booney et al.
2002/0000446 A1 1/2002 Taylor
2002/0179617 A1 12/2002 Barthlow et al.
2004/0112949 A1 6/2004 Hed et al.
2005/0029273 A1 2/2005 Hechmati
2005/0184137 A1 8/2005 Dorsey
2005/0236468 A1 10/2005 Sadlier
2006/0118608 A1 6/2006 Stahlecker
2007/0117702 A1 5/2007 Okushita et al.
2007/0284426 A1 12/2007 Lo
2008/0078824 A1 4/2008 Spriegel et al.
2008/0078825 A1 4/2008 Puls et al.
2008/0087715 A1 4/2008 Robertson et al.
2008/0121681 A1 5/2008 Wiedmeyer
2008/0156857 A1 7/2008 Johnston
2009/0321508 A1 12/2009 Fu et al.
2010/0025414 A1 2/2010 Mansour et al.
2010/0044424 A1 2/2010 Van Handel
2010/0072268 A1* 3/2010 Johnson ................ B65D 25/20 229/403
2010/0108693 A1 5/2010 Zhang et al.
2010/0108694 A1 5/2010 Sedlbauer et al.
2010/0187296 A1 7/2010 Puls et al.
2012/0097685 A1 4/2012 Babinsky et al.
2012/0199641 A1 8/2012 Hsieh
2012/0261427 A1 10/2012 Bates
2012/0285972 A1 11/2012 Fu
2012/0318805 A1 12/2012 Leser
2013/0001286 A1 1/2013 Stahlecker
2013/0001289 A1 1/2013 Tedford
2013/0303351 A1 11/2013 Fu
2015/0048086 A1 2/2015 Brown
2015/0108146 A1 4/2015 Jameson
2017/0113831 A1 4/2017 Aubele et al.
2017/0326830 A1 11/2017 Fu et al.
2017/0340149 A1 11/2017 Morgan
2018/0016052 A1 1/2018 Tomioka
2018/0263391 A1 9/2018 Garza et al.
2018/0370666 A1 12/2018 Garza et al.
2022/0234812 A1 7/2022 Mohan et al.

(56) References Cited

U.S. PATENT DOCUMENTS

FOREIGN PATENT DOCUMENTS

| | | | |
|---|---|---|---|
| DE | 198 40 841 | | 3/2000 |
| EP | 1 227 042 | | 4/2004 |
| EP | 1 227 043 | | 6/2004 |
| EP | 1 479 512 | A2 | 11/2004 |
| EP | 1 830 056 | | 9/2007 |
| EP | 1 031 514 | | 10/2007 |
| EP | 2 848 554 | A2 | 3/2015 |
| GB | 1 261 532 | | 1/1972 |
| JP | 8-276927 | | 10/1996 |
| JP | 2000-118521 | | 4/2000 |
| JP | 2000-142834 | | 5/2000 |
| JP | 2000-226022 | | 8/2000 |
| WO | WO 94/03326 | | 2/1994 |
| WO | WO 2016/136853 | A1 | 9/2016 |
| WO | WO 2017/074510 | A1 | 5/2017 |
| WO | WO 2019/200189 | A1 | 10/2019 |

OTHER PUBLICATIONS

International Search Report and Written Opinion for US/PCT/2019/027119 dated Jul. 29, 2019.
International Search Report and Written Opinion for US/PCT/2019/027120 dated Jul. 31, 2019.
Supplementary European Search Report for EP 19 78 5215 dated Dec. 6, 2021.
Third-Party Submission Under 37 CFR 1.290 for U.S. Appl. No. 16/382,265 dated Apr. 14, 2020, including Concise Description of Relevance.
Supplementary EP Search Report for EP 19 78 5699 dated Jan. 14, 2022.
Supplementary EP Search Report for EP 19 78 4621 dated Jan. 14, 2022.
Issue Fee Transmittal for U.S. Appl. No. 16/382,265 dated May 16, 2022.
Notice of Allowance and Fee(s) Due for U.S. Appl. No. 16/382,265 dated Feb. 24, 2022.
Amendment A and Response to Office Action for U.S. Appl. No. 16/382,265 dated Dec. 2, 2021.
Office Action for U.S. Appl. No. 16/382,265 dated Sep. 2, 2021.
Response to Restriction Requirement for U.S. Appl. No. 16/382,265 dated May 25, 2021.
Office Action for U.S. Appl. No. 16/382,265 dated May 4, 2021.
Office Action for U.S. Appl. No. 16/382,270 dated Apr. 6, 2022.
Amendment D and Response to Office Action for U.S. Appl. No. 16/382,270 dated Feb. 11, 2022.
Office Action for U.S. Appl. No. 16/382,270 dated Oct. 13, 2021.
Amendment C and Response to Office Action for U.S. Appl. No. 16/382,270 dated Aug. 3, 2021.
Office Action for U.S. Appl. No. 16/382,270 dated May 5, 2021.
Request for Continued Examination (RCE) Transmittal for U.S. Appl. No. 16/382,270 dated Oct. 10, 2020.
Amendment B and Response to Final Office Action for U.S. Appl. No. 16/382,270 dated Oct. 10, 2020.
Office Action for U.S. Appl. No. 16/382,270 dated Jul. 20, 2020.
Amendment A and Response to Office Action for U.S. Appl. No. 16/382,270 dated Mar. 25, 2020.
Office Action for U.S. Appl. No. 16/382,270 dated Jan. 7, 2020.
Issue Notification for U.S. Appl. No. 16/382,265 dated Jul. 13, 2022.
Notice of Allowance and Fees(s) Due for U.S. Appl. No. 16/382,270 dated May 4, 2023.
Amendment F and Response to Office Action for U.S. Appl. No. 16/382,270 dated Jan. 3, 2023.
Office Action for U.S. Appl. No. 16/382,270 dated Oct. 7, 2022.
Request for Continued Examination (RCE) Transmittal for U.S. Appl. No. 16/382,270 dated Aug. 5, 2022.
Amendment E and Response to Final Office Action for U.S. Appl. No. 16/382,270 dated Aug. 5, 2022.
Office Action for U.S. Appl. No. 17/723,802 dated May 8, 2023.
Response to Election of Species Requirement for U.S. Appl. No. 17/723,802 dated Apr. 19, 2023.
Office Action for U.S. Appl. No. 17/723,802 dated Mar. 15, 2023.
International Search Report and Written Opinion for PCT/US2023/018900 dated Jul. 26, 2023.
Office Action for European Patent Application No. 19 785 215.5 dated Oct. 24, 2024.

* cited by examiner

METHOD AND SYSTEM FOR FORMING A CONTAINER WITH INSULATING FEATURES

CROSS-REFERENCE TO RELATED APPLICATIONS

This application is a continuation in part of U.S. patent application Ser. No. 17/723,802, filed Apr. 19, 2022 which is a continuation-in-part of U.S. patent application Ser. No. 16/382,265, filed Apr. 12, 2019, now U.S. Pat. No. 11,401,100, which claims the benefit of each of U.S. Provisional Patent Application No. 62/657,246, filed on Apr. 13, 2018, U.S. Provisional Patent Application No. 62/674,834, filed on May 22, 2018, and U.S. Provisional Patent Application No. 62/794,131, filed on Jan. 18, 2019, and U.S. patent application Ser. No. 17/723,802 is a continuation-in-part of U.S. patent application Ser. No. 16/382,270, filed Apr. 12, 2019 which claims the benefit of each of U.S. Provisional Patent Application No. 62/657,246, filed on Apr. 13, 2018, U.S. Provisional Patent Application No. 62/674,834, filed on May 22, 2018, and U.S. Provisional Patent Application No. 62/794,131, filed on Jan. 18, 2019. This application also claims the benefit of U.S. Provisional Patent Application No. 63/333,710, filed on Apr. 22, 2022.

INCORPORATION BY REFERENCE

The disclosures of each of U.S. patent application Ser. No. 17/723,802, filed Apr. 19, 2022, U.S. patent application Ser. No. 16/382,265, filed Apr. 12, 2019, now U.S. Pat. No. 11,401,100, U.S. patent application Ser. No. 16/382,270, filed Apr. 12, 2019, U.S. Provisional Patent Application No. 62/657,246, filed on Apr. 13, 2018, U.S. Provisional Patent Application No. 62/674,834, filed on May 22, 2018, U.S. Provisional Patent Application No. 62/794,131, filed on Jan. 18, 2019, and U.S. Provisional Patent Application No. 63/333,710, filed on Apr. 22, 2022, are hereby incorporated by reference for all purposes as if presented herein in their entirety.

BACKGROUND OF THE DISCLOSURE

The present disclosure generally relates to containers for containing fluid, for example, beverage containers. In one embodiment, the present disclosure relates to a container formed from a sidewall and having insulating features sufficient to maintain a desired temperature of a cool, cold, and/or at least partially frozen beverage, and/or one or more surface conditions of the container.

SUMMARY OF THE DISCLOSURE

According to one aspect of the disclosure, a container for containing a cold fluid comprises a sidewall construct comprising an inner sidewall extending at least partially around an interior of the container, an outer sleeve attached to the inner sidewall, and a cavity defined between the inner sidewall and the outer sleeve. The container further comprises a closed bottom defining a bottom of the interior of the container. The container further comprises insulating features comprising the cavity and a plurality of annular bands, each annular band of the plurality of annular bands comprises a spacer that extends in the cavity from the inner sidewall to the outer sleeve. Adjacent bands define a respective pocket of a plurality of pockets in the cavity such that the insulating features maintain a desired temperature of the cold fluid.

According to another aspect of the disclosure, a sidewall construct for forming a fluid container for containing a cold fluid comprises an inner sidewall extending at least partially around an interior of the container, an outer sleeve attached to the inner sidewall, a cavity defined between the inner sidewall and the outer sleeve, and insulating features comprising the cavity and a plurality of annular bands. Each band of the plurality of annular bands comprises a spacer that extends in the cavity from the inner sidewall to the outer sleeve, and adjacent bands define a respective pocket of a plurality of pockets in the cavity for maintaining a desired temperature of the cold fluid.

According to another aspect of the disclosure, a method of forming a container for containing a cold fluid comprises obtaining an inner sidewall and an outer sleeve, and attaching the outer sleeve to the inner sidewall to form a sidewall construct with a cavity defined between the inner sidewall and the outer sleeve. The attaching comprises forming insulating features in the sidewall construct, the insulating features comprise the cavity and a plurality of annular bands, each annular band of the plurality of annular bands comprises a spacer that extends in the cavity from the inner sidewall to the outer sleeve, adjacent bands define a respective pocket of a plurality of pockets in the cavity for maintaining a desired temperature of the cold fluid. The method further comprises forming an interior of the container by positioning the sidewall construct so that the inner sidewall extends at least partially around the interior. The method further comprises positioning a closed bottom relative to the sidewall construct.

According to another aspect of the disclosure, a method of forming a container for containing a cold fluid comprises obtaining a base container having an inner sidewall and a bottom secured to the inner sidewall, and the inner sidewall extending at least partially around an interior that defines an interior volume of the container. The method comprises forming a plurality of annular bands on the inner sidewall of the base container. The forming the plurality of annular bands comprises applying a first layer of material to the inner sidewall and a second layer of material to the first layer of material. The method comprises obtaining an outer sleeve and attaching the outer sleeve to the inner sidewall to form a sidewall construct of the container with insulating features defined between the inner sidewall and the outer sleeve. The attaching the outer sleeve comprises pressing the outer sleeve against the plurality of annular bands to adhesively secure the outer sleeve to the inner sidewall. The insulating features comprise a cavity between the inner sidewall and the outer sleeve, the plurality of annular bands, and a plurality of pockets in the cavity formed between adjacent annular bands. The insulating features are for maintaining a desired temperature of the cold fluid in the interior volume of the container.

According to another aspect of the disclosure, a system for forming a container for containing a cold fluid comprises a base container forming machine for forming a base container having an inner sidewall, a bottom secured to the inner sidewall, the inner sidewall extends at least partially around an interior that defines an interior volume of the container. The system comprises an intermediate container forming machine for receiving the base container from the base container forming machine and forming an intermediate container. The intermediate container forming machine has a first material applicator for applying a first layer of material to the inner sidewall of the base container and a second material applicator for applying a second layer of material to the first layer of material to form a plurality of annular bands on the inner sidewall of the base container, the intermediate container comprises the first layer of material and second layer of material applied to the base container. The system comprises an outer sleeve attachment machine for receiving the intermediate container and attaching an outer sleeve to the intermediate container.

According to another aspect of the disclosure, In a system for forming a container for containing a cold fluid, an intermediate container forming machine for receiving a base container from a base container forming machine, the base container having an inner sidewall, a bottom secured to the inner sidewall, the inner sidewall extends at least partially around an interior that defines an interior volume of the container, the intermediate container forming machine being for forming an intermediate container and discharging the intermediate container to an outer sleeve forming machine. The intermediate container forming machine comprising a turret assembly for receiving the base container and moving the base container within the intermediate container forming machine, a first material applicator for applying a first layer of material to the inner sidewall of the base container, and a second material applicator for applying a second layer of material to the first layer of material. The intermediate container forming machine comprises a discharge station for discharging the intermediate container to an outer sleeve attachment machine. The intermediate container comprises the first layer of material and second layer of material applied to the base container to form a plurality of annular bands on the inner sidewall of the base container.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

Containers according to the present disclosure can accommodate fluids, e.g., liquid or semi-liquid beverages that can include one or more solid components, of different sizes and compositions. For the purpose of illustration and not for the purpose of limiting the scope of the disclosure, the following detailed description describes a container for cool, cold, and/or at least partially frozen beverages, e.g., iced coffee, cold brew coffee, blended ice beverages (such as smoothies, slush beverages, milkshakes, etc.), iced tea, lemonade, and other flavored or unflavored beverages, to name a few. It will be understood that the containers described herein can hold different types of beverages and/or products containing one or more food items without departing from the disclosure.

In this specification, the terms "lower," "bottom," "upper," and "top" indicate orientations determined in relation to fully erected and upright containers. As described herein, containers can be formed from blanks by overlapping multiple portions, panels, and/or end flaps. Such portions, panels, and/or end flaps may be designated herein in terms relative to one another, e.g., "first", "second", "third", etc., in sequential or non-sequential reference, without departing from the disclosure.

Figure 1:
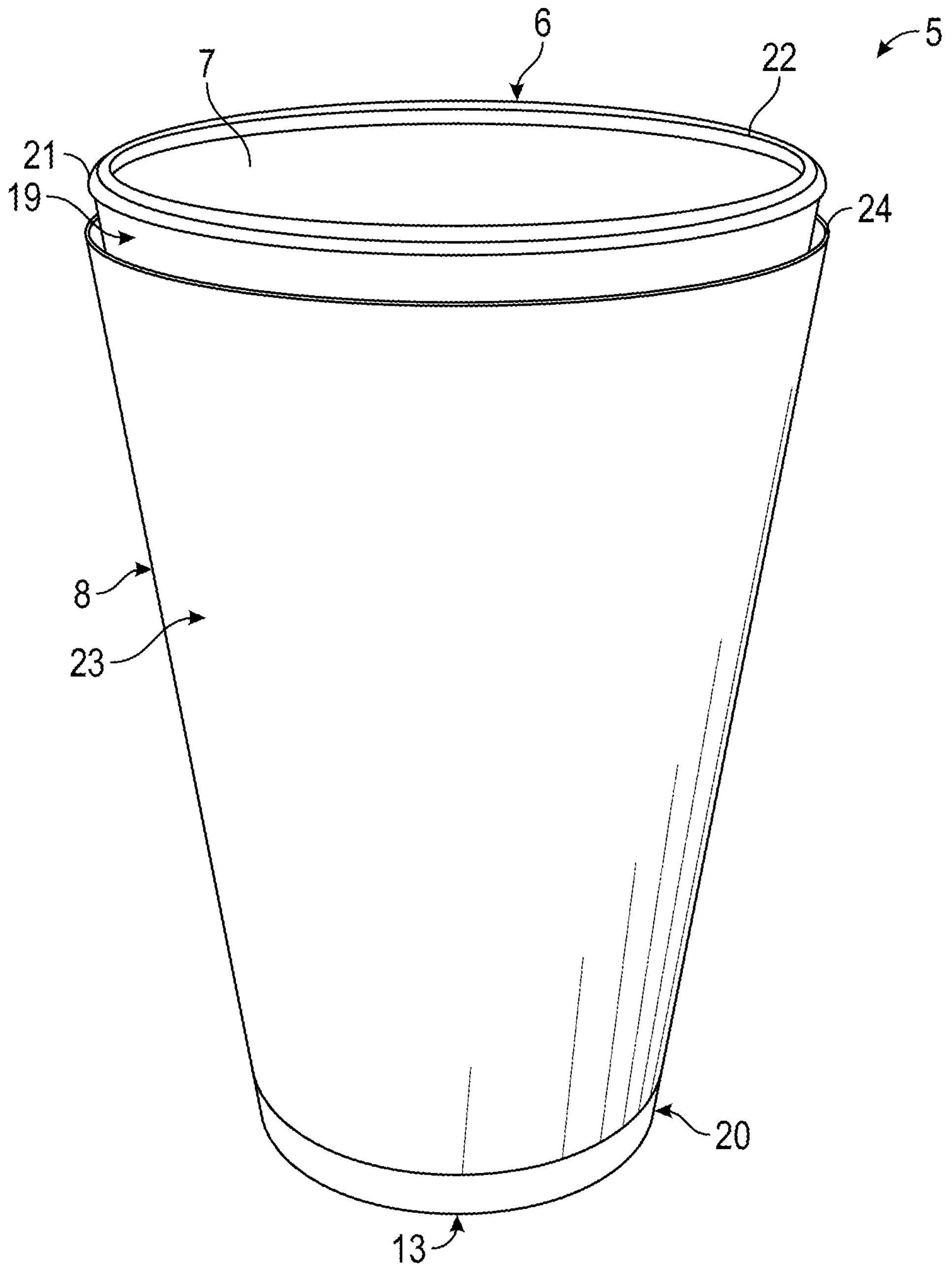
FIG. 1 is a perspective view of a container according to a first exemplary embodiment of the disclosure.
Figure 2:
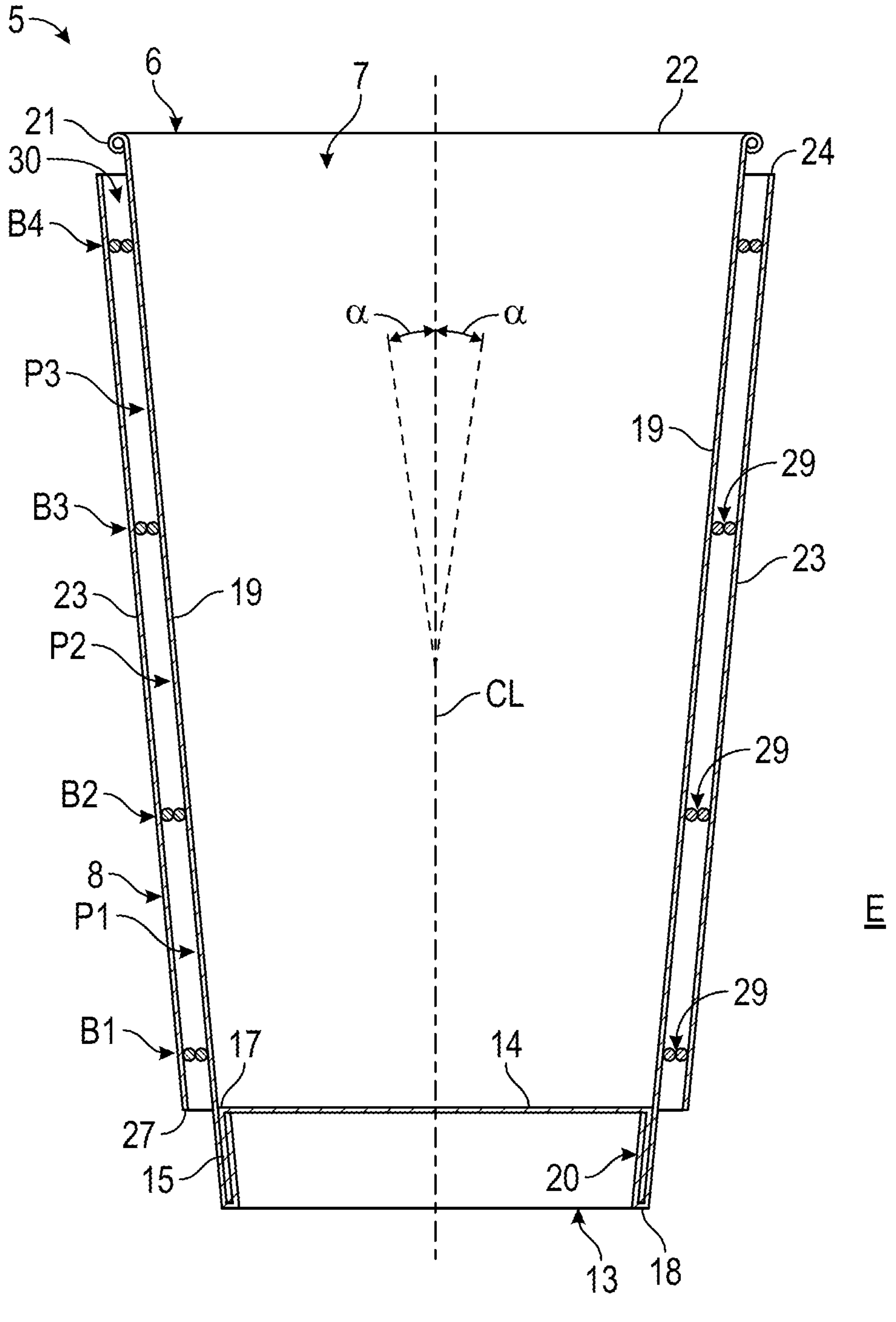
FIG. 2 is a schematic cross-sectional view of the container of FIG. 1.

FIG. 1 is a perspective view, and FIG. 2 is a cross-sectional view, of a container 5 according to a first exemplary embodiment of the disclosure. In one embodiment, the container 5 is a cup having the general shape of a truncated cone with an open top 6, a closed bottom 13, and a sidewall construct 8 extending from a bottom edge to a top edge of the container 5. The closed bottom 13 and sidewall construct 8 define and extend at least partially around an interior space 7 (FIG. 2) of the container 5 with an interior volume that is for holding fluid such as a cool, cold, or at least partially frozen beverage.

In the illustrated embodiment, the sidewall construct 8 comprises an annular inner sidewall 19 (broadly, "inner wall") and an outer sleeve 23 (broadly, "outer wall") attached to the inner sidewall 19 such that the sidewall construct 8 can be referred to as a double wall structure. In one embodiment, one or both of the inner sidewall 19 and the sleeve 23 can be formed of paperboard, having one or more surface provided with, for example, a thermoplastic coating. Such paperboard can be provided with one or more desired surface features, for example, ribs or ridges, such as in fluted or corrugated paperboard. In one embodiment, the inner sidewall 19 can have a thickness of at least about 12 mil and the sleeve 23 can have a thickness of at least about 1 mil.

Figure 3:
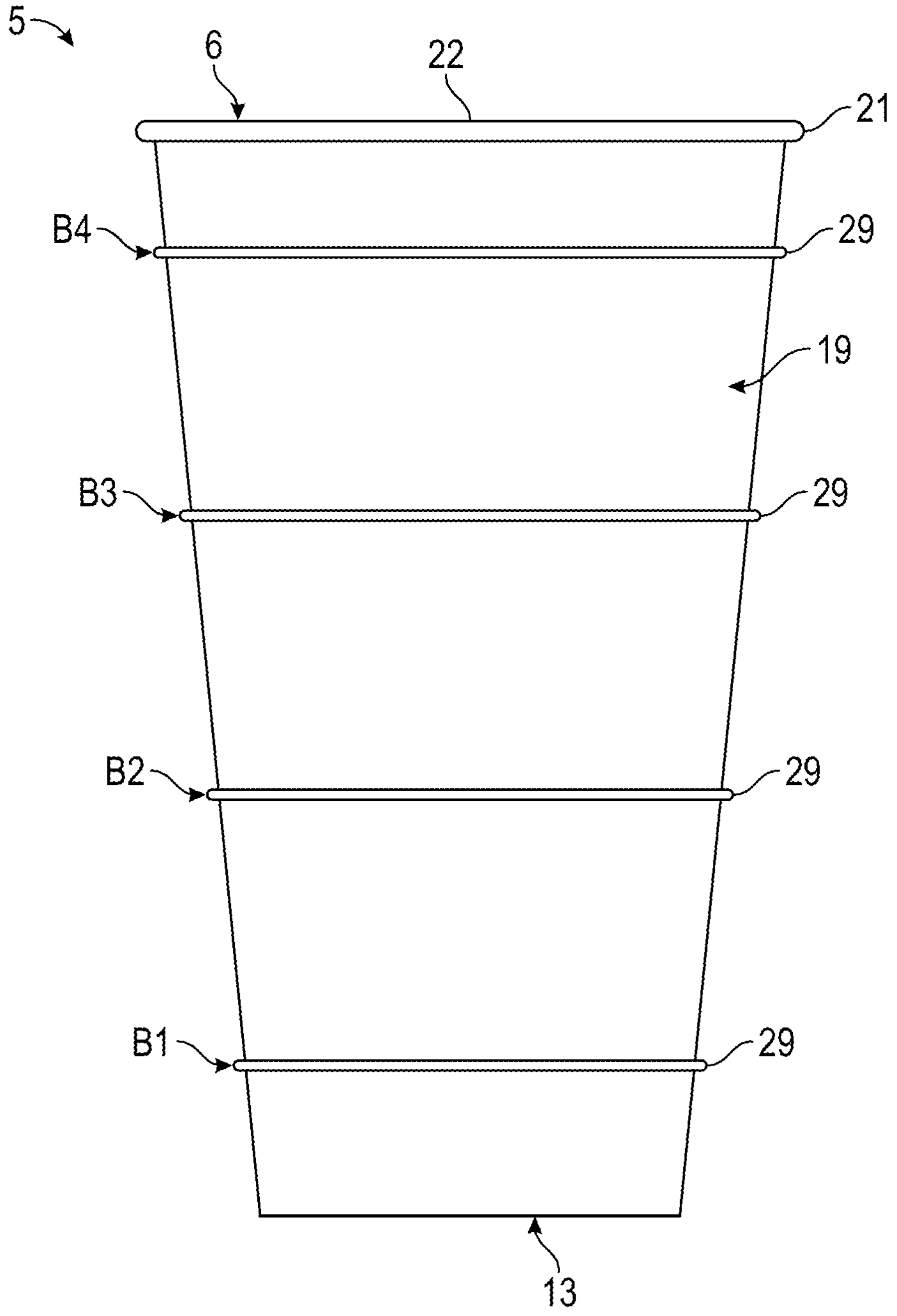
FIG. 3 is a front view of the container of FIG. 1 with an outer sleeve removed.
Figure 4:
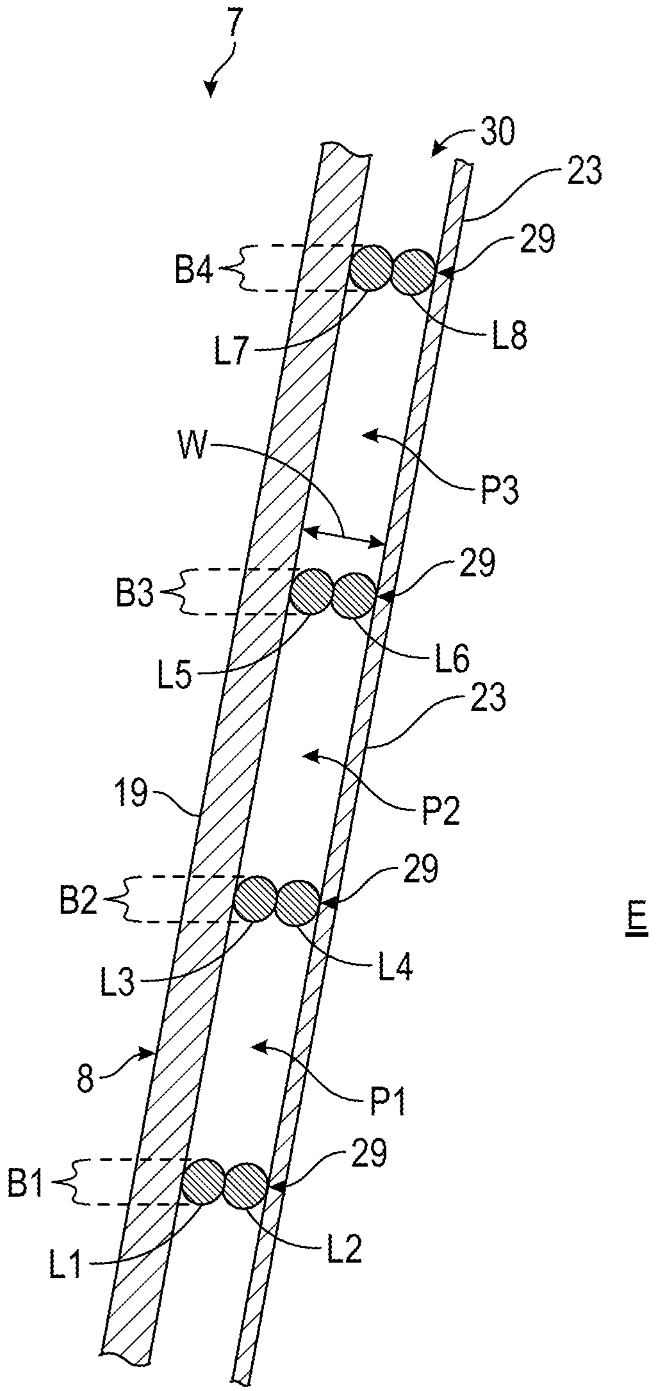
FIG. 4 is a schematic cross-sectional view of a portion of a sidewall construct of the container of FIG. 1.

With additional reference to FIGS. 3 and 4, the container 5 includes insulating features in the sidewall construct 8 that include bands B1, B2, B3, B4 of spacers 29 that are circumferentially disposed at different vertical heights along the sidewall construct 8. The spacers 29 can be at least partially comprised of adhesive, such as a hot melt glue or other glue, and extend from the inner sidewall 19 to the outer sleeve 23 to adhesively attach the outer sleeve 23 to the inner sidewall 19. In one embodiment, the spacers 29 can be formed from a different polymeric material. In this regard, in one embodiment, the adhesive that forms the spacers 29 can be set or cured to provide desired properties of the spacers 29. As discussed further below, the insulating features of the container 5 are arranged so that an insulation profile of the container 5 can be enhanced, for example, so that a selected or desired temperature or temperature range of the fluid in the container 5 is maintained, e.g., such that a rate of temperature increase toward an equilibrium temperature is within a selected or desired threshold, and/or so that one or more outer surface conditions of the container 5 can be maintained.

In one embodiment, the insulating features of the container 5 are arranged such that a relatively low temperature, e.g., a temperature at or below about approximately 40° F. (or any suitable temperature for a cold beverage) of a cool, cold, and/or at least partially frozen fluid in the interior space 7 of the container 5 can be maintained, and such that the transfer of heat to the cool, cold, and/or at least partially frozen fluid in the interior space 7 from a surrounding environment E and/or a customer's hands can be substantially minimized, inhibited, and/or prevented. The insulating features of the container 5 additionally can maintain one or more surface conditions of the exterior surface of the sleeve 23 and/or exposed portions of the inner sidewall 19, for example, a surface temperature above the dew point of the surrounding environment such that condensation is minimized, inhibited, and/or prevented from forming on the container 5. In one embodiment, such condition can be maintained for up to and including about an hour or more. In this regard, a user can be provided with a more comfortable surface to grasp the container 5, e.g., such that the exterior surface of the outer sleeve 23 does not present or minimizes any cold temperature regions or zones that are uncomfortable to a customer's touch and/or a wet or slippery texture due to condensation. The container 5 can be provided with a different arrangement of insulating features without departing from the disclosure.

As shown, the bottom 13 of the container 5 includes a generally circular bottom panel 14 and an annular leg 15 downwardly-depending from the bottom panel 14 at a generally circular line of weakening 17. The bottom panel 14 has a diameter that generally corresponds to a horizontal distance between opposing sides of the inner sidewall 19. The inner sidewall 19 extends upwardly from the closed bottom 13 to define the interior space 7 of the container 5. The annular leg 15 is adhesively attached to a lower edge margin 20 of the inner sidewall 19 to secure the bottom 13 to the sidewall construct 8 and to form the bottom of the interior space 7 of the container 5. As shown, the lower edge margin 20 of the inner sidewall 19 extends along the outer surface of the annular leg 15, wraps under a lower edge thereof, and extends upwardly along the interior surface of the annular leg 15 toward the bottom panel 14. The lower edge margin 20 of the inner sidewall 19 can be an at least partially flexible portion of the inner sidewall 19 configured to engage the annular leg 15, and can include surface features to facilitate such engagement, for example, an adhesive treatment and/or frictionally-enhancing patterning. As described herein, the portion of the lower edge margin 20 of the inner sidewall 19 overlying the lower edge of the annular leg 15 will define an inner bottom edge or inner lower edge 18 of the inner sidewall 19. In one embodiment, the lower edge of the annular leg 15 can define the lower edge of the coupled inner sidewall 19 and the bottom 13.

The bottom 13 can be secured to the sidewall construct 8 in a different configuration without departing from the disclosure. For example, in one embodiment, the bottom 13 can be inserted into the interior space 7 formed by the sidewall construct 8 and coupled thereto, e.g., in the manner described above. In another embodiment, the bottom 13 and the annular leg 15 of the container 5 can be integrally formed with the inner sidewall 19 or can be otherwise attached to a portion of the inner sidewall 19 by other attachment means. In still another embodiment, the bottom 13 can be coupled to the inner sidewall 19 as described above, and the coupled inner sidewall 19/bottom 13 can be inserted into or otherwise coupled with the sleeve 23, e.g., via the spacers 29. In yet another embodiment, the sidewall construct 8 can be formed in a flat configuration, and then wrapped around and coupled to the bottom 13 in the manner described above.

As also shown, a top edge of the inner sidewall 19 is curved, curled, or otherwise flanged to define a top or upper rim 21 of the container 5 that circumscribes an opening 22 in communication with the interior space 7 of the container 5. The rim 21 and/or an upper portion of the container 5 can be configured to engage a lid or other top closure structure.

The illustrated configuration of the truncated conical shape of the container 5 can be achieved by forming the inner sidewall 19 from a flat blank by folding around a mandrel such that an overlapping seam is provided. The inner sidewall 19 (and the sleeve 23 disposed therearound), as shown, have a tapered configuration such that the inner sidewall 19 and the sleeve 23 extend at a constant angle $\alpha$ relative to a vertical centerline CL of the container 5.

Still referring to FIGS. 1-4, the outer sleeve or sleeve 23, e.g., a wrap or other layer, is disposed in at least partial circumferential engagement with the inner sidewall 19 such that the sleeve 23 presents an outer surface of the container 5 for engagement by a user. As shown, the sleeve 23 includes an upper edge 24 proximate the rim 21 and the sleeve 23 protrudes downwardly such that an outer bottom edge or outer lower edge 27 of the sleeve 23 is spaced above the lower edge 18 of the inner sidewall 19. In one embodiment, the lower edge 27 of the sleeve 23 is spaced above the lower edge 18 of the inner sidewall 19 by approximately the vertical length of the lower edge margin 20 such that the lower edge 27 of the sleeve 23 is substantially level with the bottom panel 14 of the bottom 13 of the container 5. In one embodiment, the lower edge 27 of the sleeve 23 can be approximately level with the lower edge 18 of the inner sidewall 19.

As described herein, at least the interface between the sleeve 23 and the inner sidewall 19 of the container 5 forms insulating features of the container 5 that include a cavity 30 defined between the inner wall 19 and the outer sleeve 23. In one embodiment, the insulating features of the container 5 can also include one or more portions of the inner sidewall 19 and/or the sleeve 23. Alternative insulating features are further described in U.S. Provisional Patent Application No. 62/657,246, filed on Apr. 13, 2018, and U.S. Provisional Patent Application No. 62/674,834, filed on May 22, 2018, the entire contents of each of which are incorporated by reference herein.

FIG. 3 is a front view of the container 5 with the sleeve 23 removed such that the inner sidewall 19 is visible. As shown, a plurality of annular bands B1, B2, B3, B4 of adhesive are applied between the inner sidewall 19 and the outer sleeve 23 to attach the outer sleeve 23 to the inner sidewall 19 and to form the spacers 29. In one embodiment, the annular bands B1, B2, B3, B4 are each a continuous pattern of adhesive to form respective continuous spacers 29. As shown in FIG. 4, the bands B1, B2, B3, B4 can each be comprised of two respective layers of adhesive L1, L2, L3, L4 and L5, L6, L7, L8 to form the spacers 29. As described above, the adhesive that forms the spacers 29 can be set or cured to provide desired properties of the spacers 29. In one embodiment, a respective first layer L1, L2, L3, L4 of adhesive can be applied to the outer surface of the sidewall construct 8 or to the interior surface of the sleeve 23, allowed to at least partially set or cure, and a respective second layer L5, L6, L7, L8 of adhesive can be applied thereon. In another embodiment, a single layer of adhesive can be applied at a desired thickness to form one or more of the bands B1, B2, B3, B4.

As described further below, one or more of the bands B1, B2, B3, B4 can be a continuous band of adhesive arranged between the inner sidewall 19 and the outer sleeve 23 such that an at least partial seal is provided, e.g., to minimize, inhibit, and/or prevent the passage of fluid thereby. In one embodiment, one or more of the bands B1 through B4 can have one or more discontinuities therealong, for example, to provide ventilation paths among the bands B1, B2, B3, B4 and/or an external environment E. It will be understood that a different numbers of bands of spacers 29 can be present without departing from the disclosure. In one embodiment, surface features such as bands, ridges, protrusions, etc., can be provided in at least partial circumferential engagement around the inner sidewall 19, and can provide a surface or substrate upon which the bands of adhesive that form the spacers 29 can applied. Such surface features can provide an optimal surface for the adhesive interface between the inner sidewall 19 and the sleeve 23.

As shown in FIGS. 2 and 4, a pocket P1 is defined in the cavity 30 between the inner sidewall 19 and the sleeve 23 between the band B1 and the band B2, a pocket P2 is defined in the cavity 30 between the inner sidewall 19 and the sleeve 23 between the band B2 and the band B3, and a pocket P3 is defined in the cavity 30 between the inner sidewall 19 and the sleeve 23 between the band B3 and the band B4. At least the pockets P1, P2, P3 provide insulating spaces or gaps between the inner sidewall 19 and the sleeve 23. As described, one or more of the pockets P1, P2, P3 can be a region in which fluid is at least partially held or sealed by the arrangement of the inner sidewall 19, the outer sleeve 23, and the respective bands B1, B2, B3, B4. In one embodiment, each pocket P1, P2, P3 can have a width W measured from the inner sidewall 19 to the outer sleeve 23 and at least partially determined by the size of the spacers 29, for example, between about 60 mils and about 120 mils, for example, about 60 mils, about 70 mils, about 80 mils, about 90 mils, about 100 mils, about 110 mils, about 120 mils, etc. or integer or non-integer numbers therebetween. In one embodiment, the width W can be about 80 mils. It will be understood the width W of the spacers 29 can be a different dimension without departing from the disclosure. The width W of the spacers 29 defines the relative spacing of the cavity 30 such that the pockets P1, P2, P3 can be configured as air gaps between the interior space 7 of the container 5 and an external environment E.

Such insulating features can resist a temperature change of fluid in the container 5 by resisting the transfer of heat from the external environment E surrounding the container 5 to the cavity 30, and further to a fluid in the interior space 7 of the container 5. In one embodiment, heat from the surrounding environment E can be at least partially transferred to air or other fluid that is trapped or otherwise maintained in one or more of the pockets P1, P2, P3 between the respective bands B1, B2, B3, B4 of spacers 29. The pockets P1, P2, P3 thus provide an additional buffer, e.g., a heat sink, between the interior space 7 of the container 5 and the surrounding environment E, in addition to the inner sidewall 19 and the outer sleeve 23. In addition to maintaining a temperature of a fluid in the interior space 7 of the container 5, such insulation provided by the arrangement of the spacers 29 can also maintain a desired surface temperature of the sleeve 23 to facilitate comfortable grasping by a customer and/or maintain one or more desired surface conditions of the sleeve 23, e.g., to minimize, inhibit, and/or prevent condensation as described above. Further still, the arrangement of the bands B1, B2, B3, B4 of spacers 29 can impart desired structural properties to the container 5, for example, by providing a desired pattern of rigidity such that an optimal pattern of flexion is provided to the container 5 during use. For example, upon grasping of the sidewall construct 8 by a customer, portions of the sleeve 23/inner sidewall 19 can bend or flex inwardly into one or more of the pockets P1, P2, P3 to provide a textured or irregular surface configuration to enhance the customer's grip on the container 5.

Figure 5:
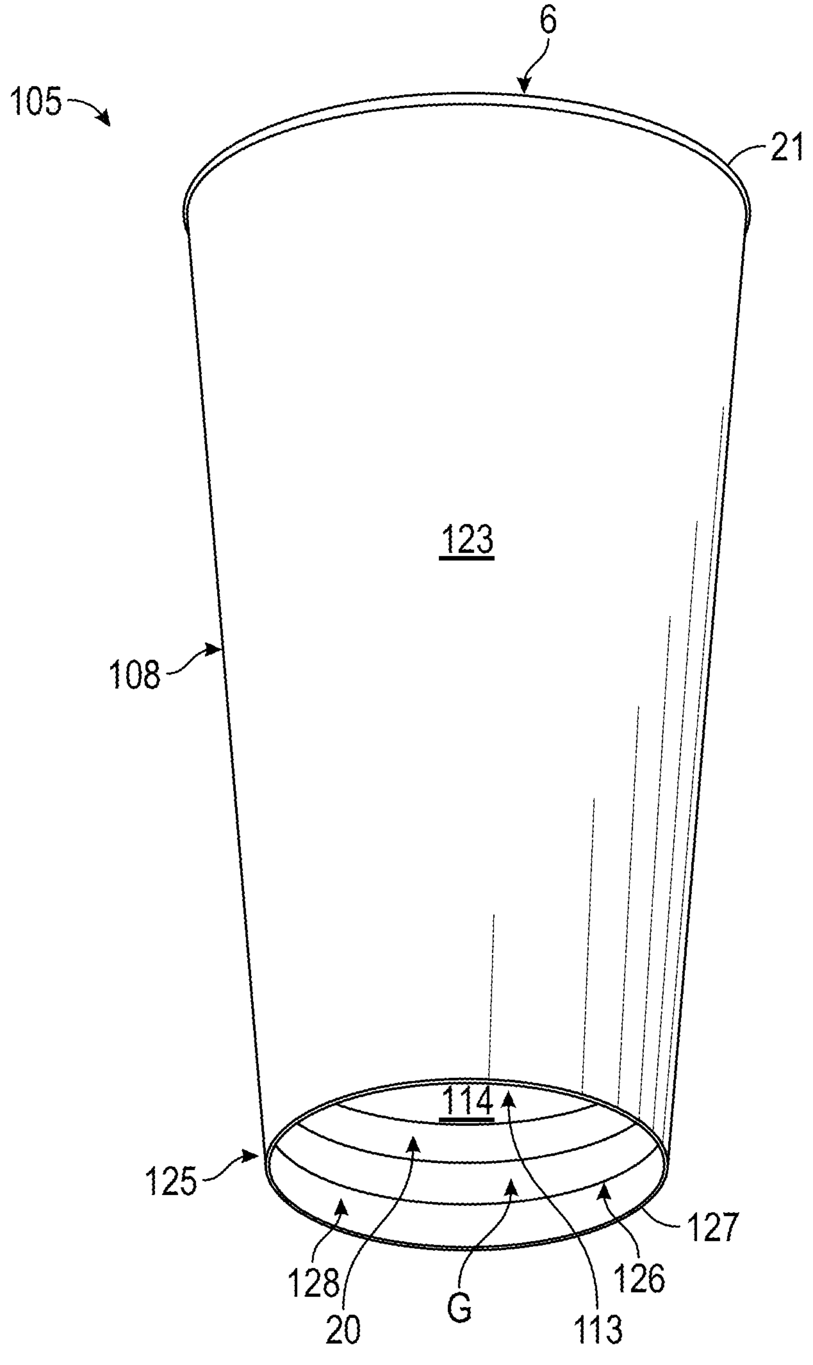
FIG. 5 is a perspective view of a container according to a second exemplary embodiment of the disclosure.
Figure 6:
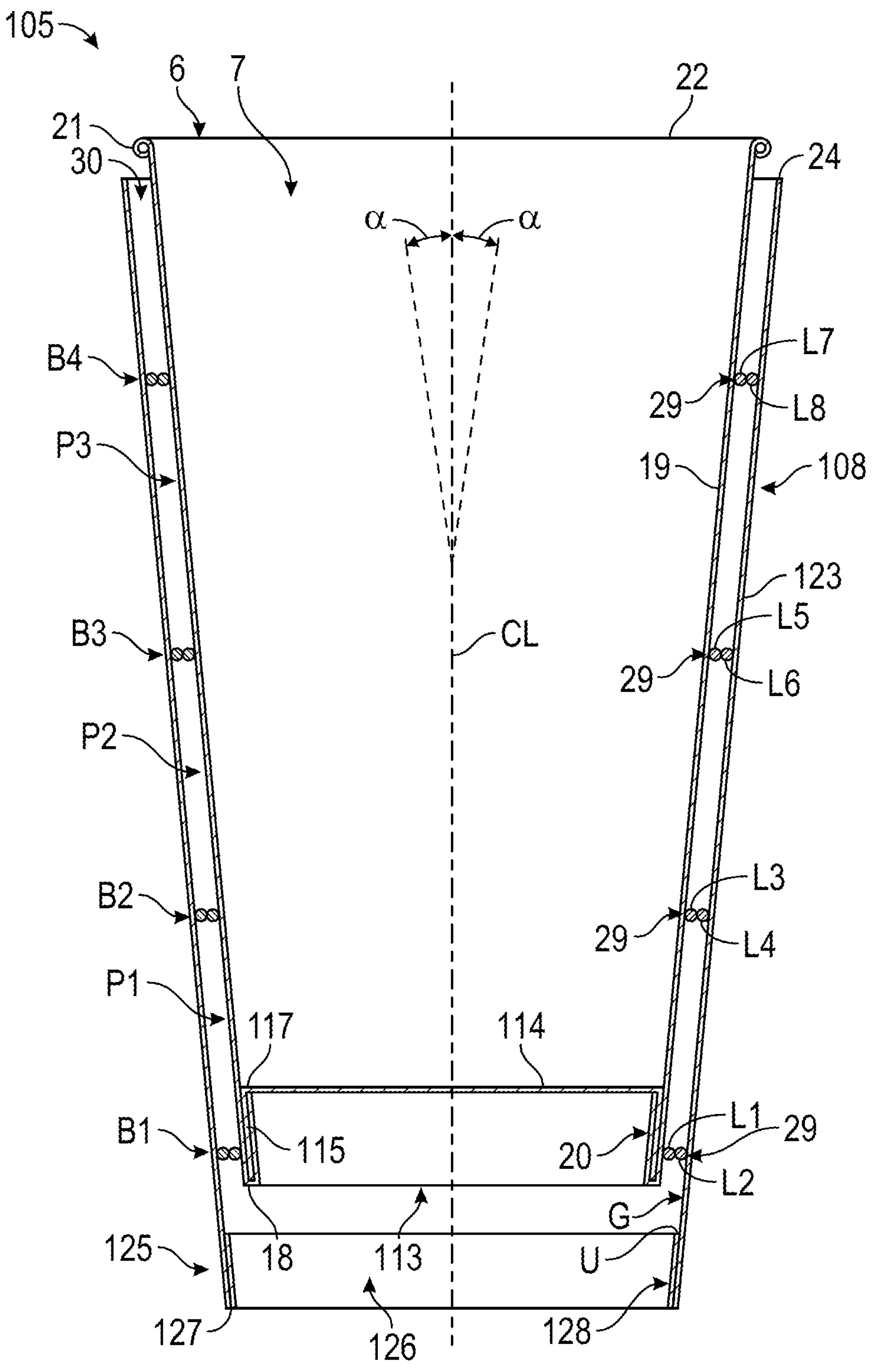
FIG. 6 is a schematic cross-sectional view of the container of FIG. 5.

Referring additionally to FIGS. 5 and 6, a container 105 is illustrated according to a second exemplary embodiment of the disclosure. It will be understood that the container 105 can be a modification of the container 5 of the first exemplary embodiment of the disclosure. One or more portions of the container 105 are substantially similar to that of the container 5 of the first exemplary embodiment of the disclosure, and like or similar reference numbers will refer to such like or similar elements.

As shown, the container 105 includes the sidewall construct 108, which includes the inner sidewall 19 and an outer sleeve 123. Insulating features are disposed between the inner sidewall 19 and the outer sleeve 123 of the container 105 as described above with respect to the container 5. For example, and as shown, bands B1, B2, B3, B4 of spacers 29 can be disposed between the inner sidewall 19 and the outer sleeve 23, and define the respective pockets P1, P2, P3 therebetween.

The outer sleeve 23 extends downwardly past the lower edge 18 of the inner sidewall 19 to form an annular base 125 of the container 105 such that a lower portion of the outer sleeve 23 defines an interior annular recess 126 between the lower edge 127 of the annular base 125/container 105 and a bottom panel 114.

A lower edge margin 128 of the sleeve 23, as shown, is interiorly folded into the annular recess 125 into face-to-face contact with a lower portion of the outer sleeve 123/annular base 125 to define the lower edge 127 and to provide a two-ply structure at a bottom portion of the annular base 125 upon which the container 105 can rest in an upright orientation.

As also shown, the closed bottom 113, including the bottom panel 114 and an annular leg 115 foldably connected thereto at a line of weakening 117, are positioned a vertical distance above the lower edge 127 of the container 105, and an annular discontinuity or annular gap G is defined between the lower edge 18 of the inner sidewall 19 and an upper edge U of the lower edge margin 128 of the sleeve 23. In one embodiment, the annular gap G can provide a vent for one or more portions of the cavity 30.

Figure 7A:
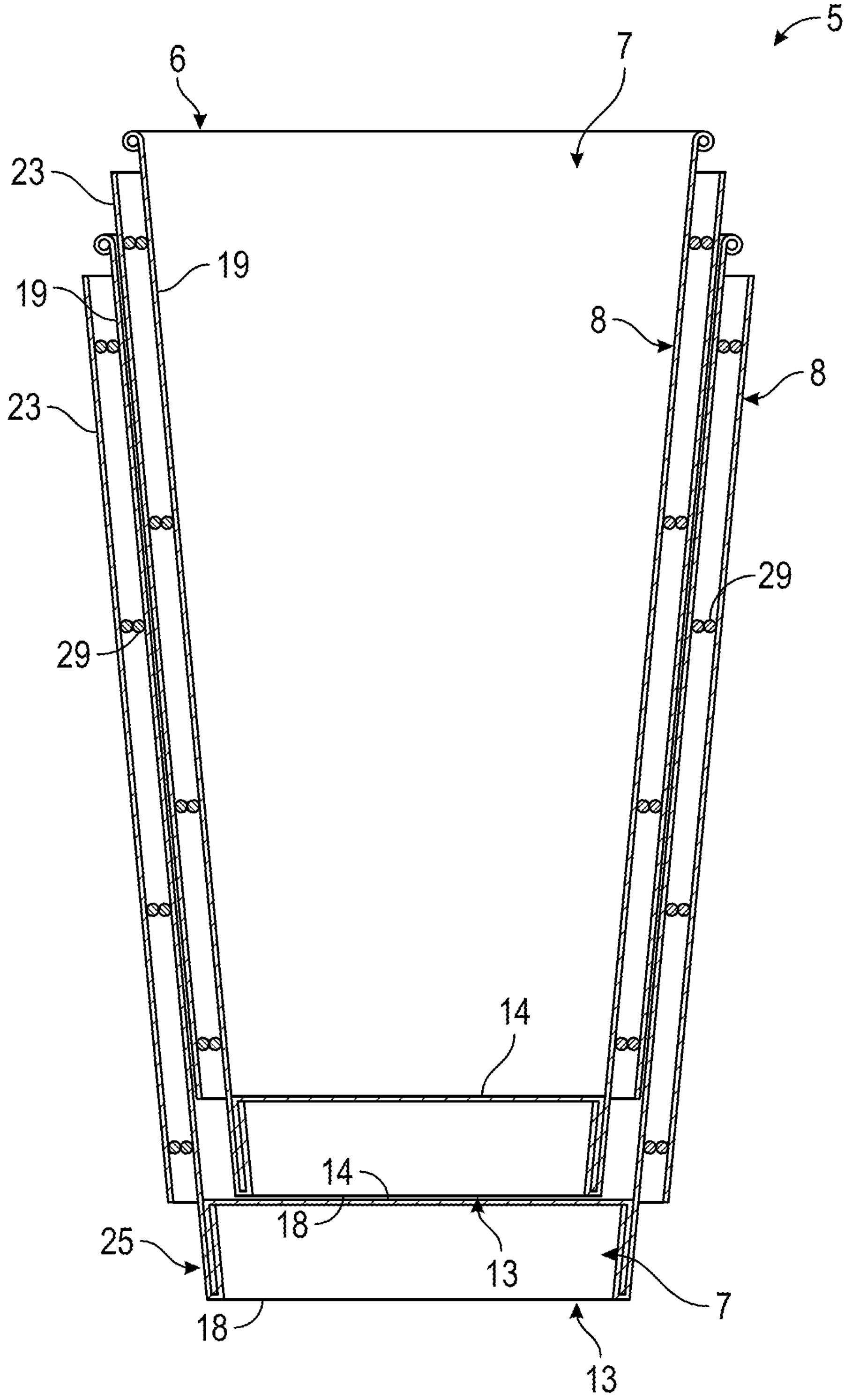
FIG. 7A is a schematic cross-sectional view of a pair of containers, each as shown in FIG. 1, in a nested arrangement.
Figure 7B:
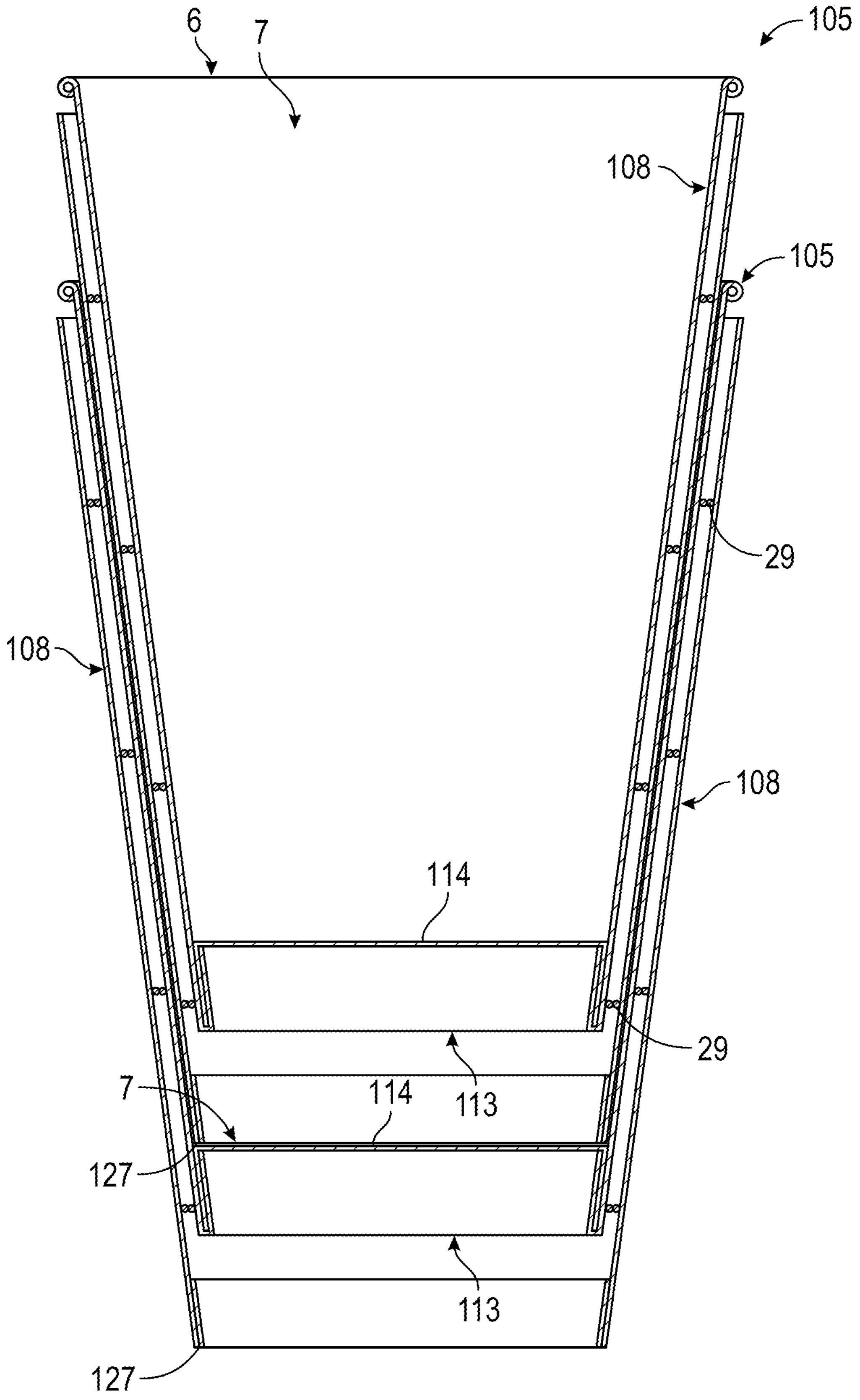
FIG. 7B is a schematic cross-sectional view of a pair of containers, each as shown in FIG. 6, in a nested arrangement.
Figure 7C:
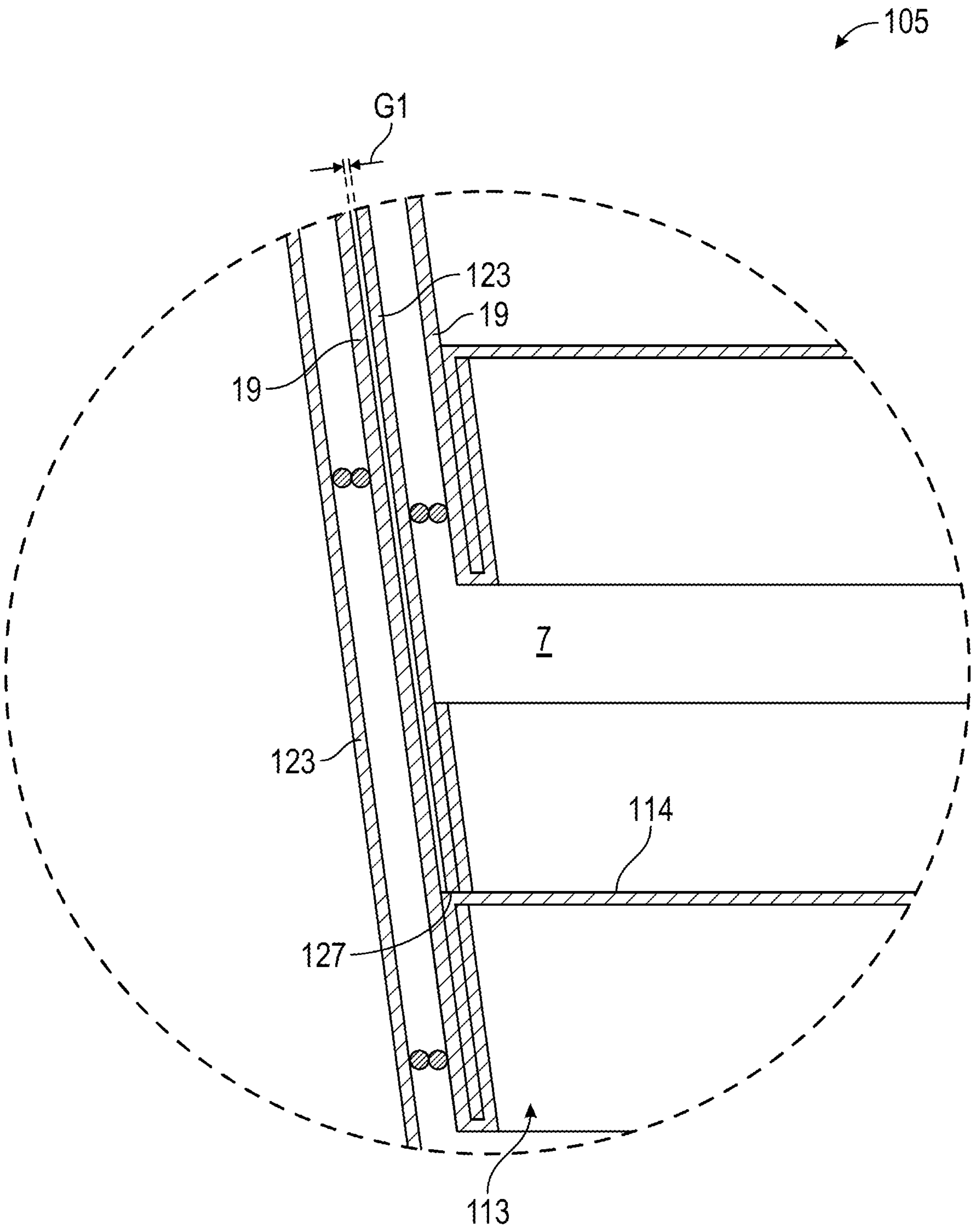
FIG. 7C is an enlarged portion of FIG. 7B.

In one embodiment, the inner sidewall 19 and the sleeve 123, with insulating features therebetween, can be separately formed from the closed bottom 113, and so that the bottom 113 can be coupled to the sidewall construct 8 to form the container 105. In this regard, the sidewall 108 can be produced as a structure that receives the bottom 113 so that the bottom 113 can be selectively coupled at different locations of the sidewall 8 to provide an interior space of the container 105 with a different selected interior volume. Such features are described in U.S. Provisional Patent Application No. 62/674,834, filed on May 22, 2018, the entire contents of which are incorporated by reference herein With additional reference to FIGS. 7A, 7B, 7C, the angle α of the sidewall construct 8 can be selected such that the lower edge 27, 127 of a respective upper container 5, 105 engages the respective bottom panel 14, 114 of a respective lower receiving container 5, 105 prior to substantial frictional engagement of the sidewall constructs 8 of the respective containers 5, 105 e.g., so that respective containers 5, 105 can be easily separated or otherwise de-nested from one another. As shown in the nested arrangement of FIG. 7C, the lower edge 127 of the upper container 105 is in contact with the bottom panel 114 of the lower container while an air gap G1 is maintained between the outer sleeve 123 of the inner container and the inner sidewall 19 of the lower container. The presence of the air gap G1 in the nested configuration prevents taper locking of the upper and lower containers 105 and allows easy separation of the upper and lower containers 105 from the nested configuration of FIGS. 7B and 7C. In one embodiment, the container 5 can include surface features to facilitate separation or de-nesting, for example, embossed and/or embossed surfaces. Such an arrangement of the containers 5, 105 can provide significant space savings for transport and/or storage of the containers 5, 105.

Referring additionally to FIGS. 8-10B, a container 205 is illustrated according to a third exemplary embodiment of the disclosure. It will be understood that the container 205 is similar to the container 105 of the second embodiment, except the container 205 includes a sidewall construct 208 with the bands B1, B2, B3, B4 of each spacer 29 between the inner sidewall 19 and the outer sleeve 123 comprising three layers of adhesive L10, L11, L12. One or more portions of the container 205 are substantially similar to that of the containers 5, 105 of the first and second exemplary embodiments of the disclosure, and like or similar reference numbers will refer to such like or similar elements.

Figure 8:
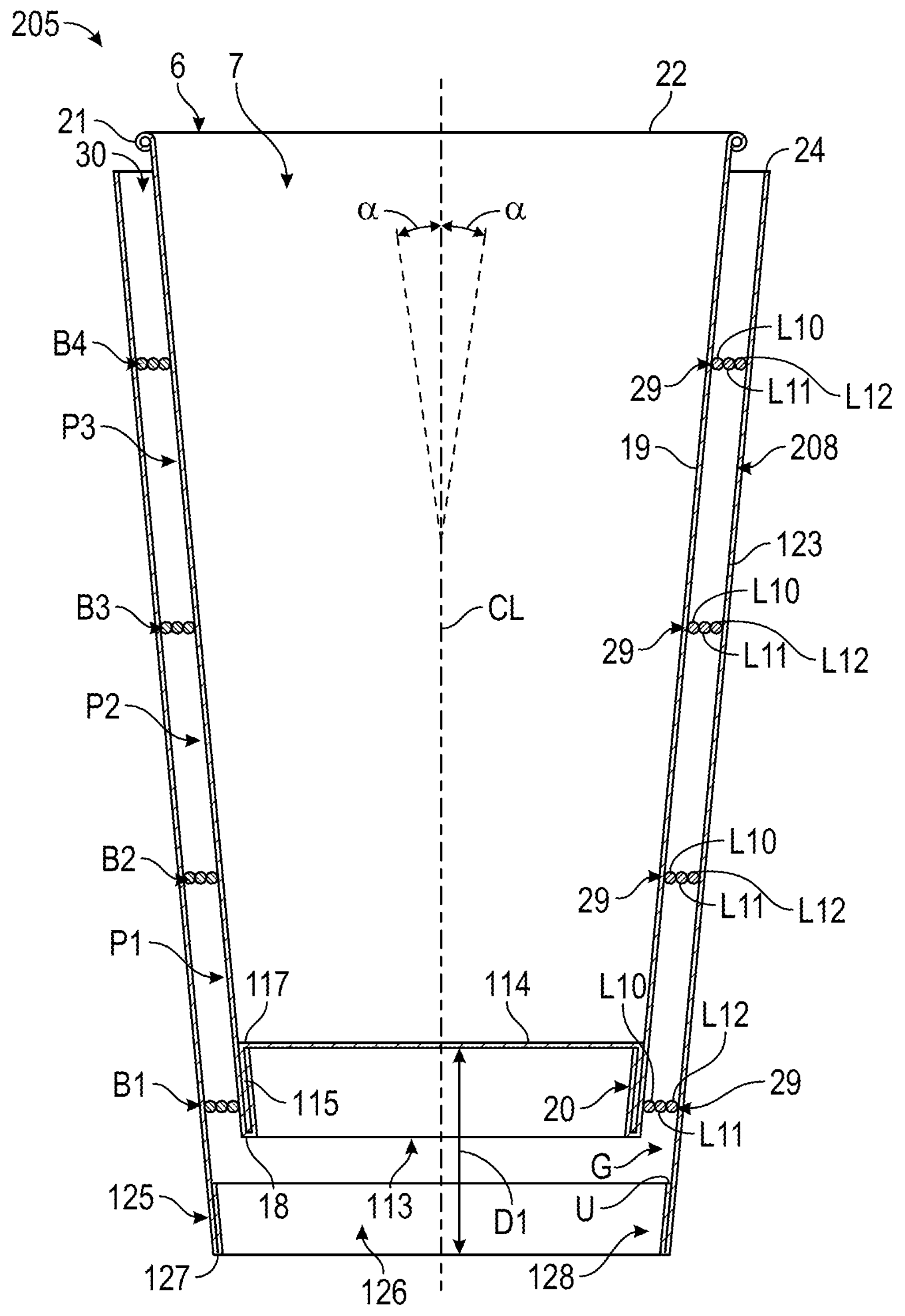
FIG. 8 is a schematic cross-sectional view of a container according to a third exemplary embodiment of the disclosure.
Figure 9:
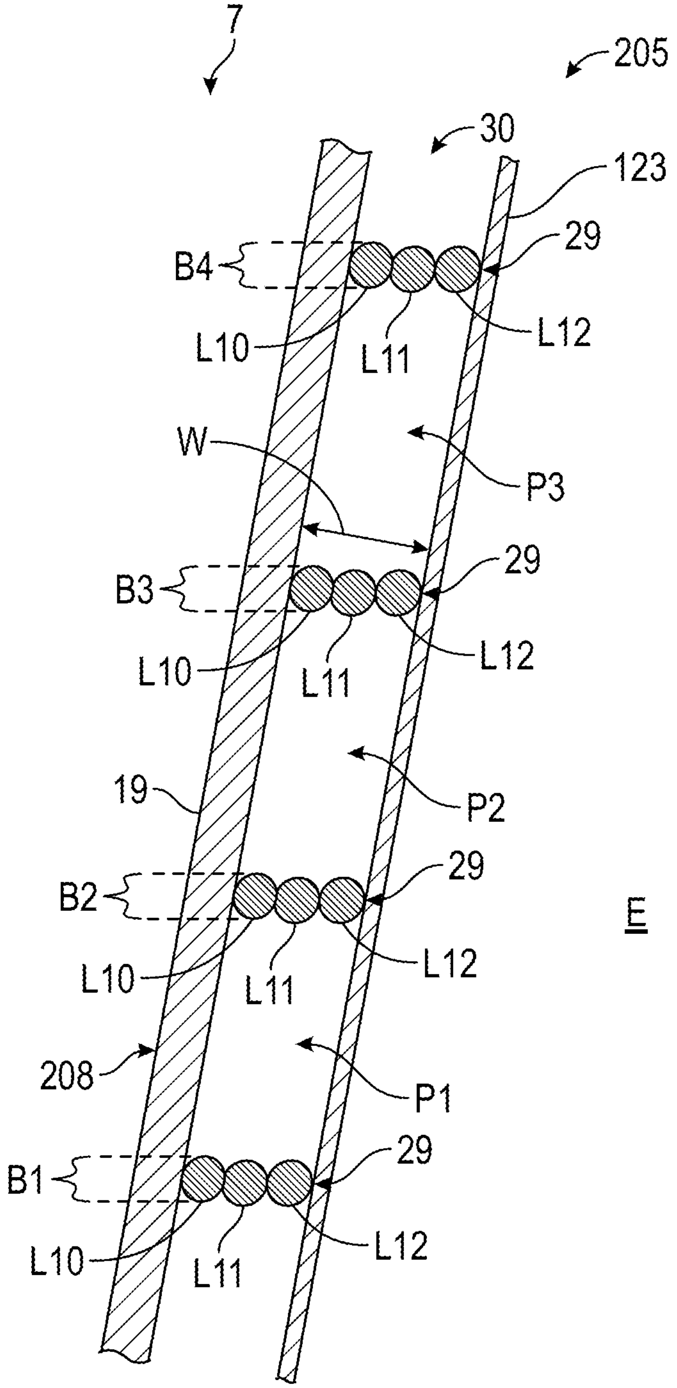
FIG. 9 is a schematic cross-sectional view of a portion of a sidewall construct of the container of FIG. 8.

In the embodiment of FIG. 8, the inner layer of adhesive L10 is in contact with the inner sidewall 19, the middle layer of adhesive L11 is adjacent and in contact with the inner layer of adhesive L10, and the outer layer of adhesive L12 is adjacent and in contact with the middle layer of adhesive L11 and the outer sleeve 123. The combined width of the three layers of adhesive L10, L11, L12 from the inner sidewall 19 to the outer sleeve 123 comprises the spacing or width W of the pockets P1, P2, P3 of the insulating features of the container 205. The insulating features and the container 205 could be otherwise shaped, arranged, and/or configured without departing from the disclosure.

The container 205 has a closed bottom 113 similar to the container 105 of the second embodiment. As with the second embodiment, the outer sleeve 123 extends downwardly past the lower edge 18 of the inner sidewall 19 to form an annular base 125 of the container 105 such that a lower portion of the outer sleeve 123 defines an interior annular recess 126 between the lower edge 127 of the annular base 125/container 105 and a bottom panel 114. A lower edge margin 128 of the sleeve 123, as shown, is interiorly folded into the annular recess 125 into face-to-face contact with a lower portion of the outer sleeve 123/annular base 125 to define the lower edge 127 and to provide a two-ply structure at a bottom portion of the annular base 125 upon which the container 105 can rest in an upright orientation. As also shown, the closed bottom 113, including the bottom panel 114 and an annular leg 115 foldably connected thereto at a line of weakening 117, are positioned a vertical distance above the lower edge 127 of the container 205, and an annular discontinuity or annular gap G is defined between the lower edge 18 of the inner sidewall 19 and an upper edge U of the lower edge margin 128 of the sleeve 123. In one embodiment, the annular gap G can provide a vent for one or more portions of the cavity 30. The closed bottom 113 could be otherwise shaped, arranged, and/or configured without departing from the disclosure.

In one embodiment, the inner sidewall 19 and the sleeve 223, with insulating features therebetween, can be separately formed from the closed bottom 113, and so that the bottom 113 can be coupled to the sidewall construct 208 to form the container 205. In this regard, the sidewall construct 208 can be produced as a structure that receives the bottom 113 so that the bottom 113 can be selectively coupled at different locations of the sidewall 8 to provide an interior space of the container 205 with a different selected interior volume. Such features are described in U.S. Provisional Patent Application No. 62/674,834, filed on May 22, 2018, and U.S. patent application Ser. No. 16/382,265 filed Apr. 12, 2019, the entire contents of which are incorporated by reference herein.

Figure 10:
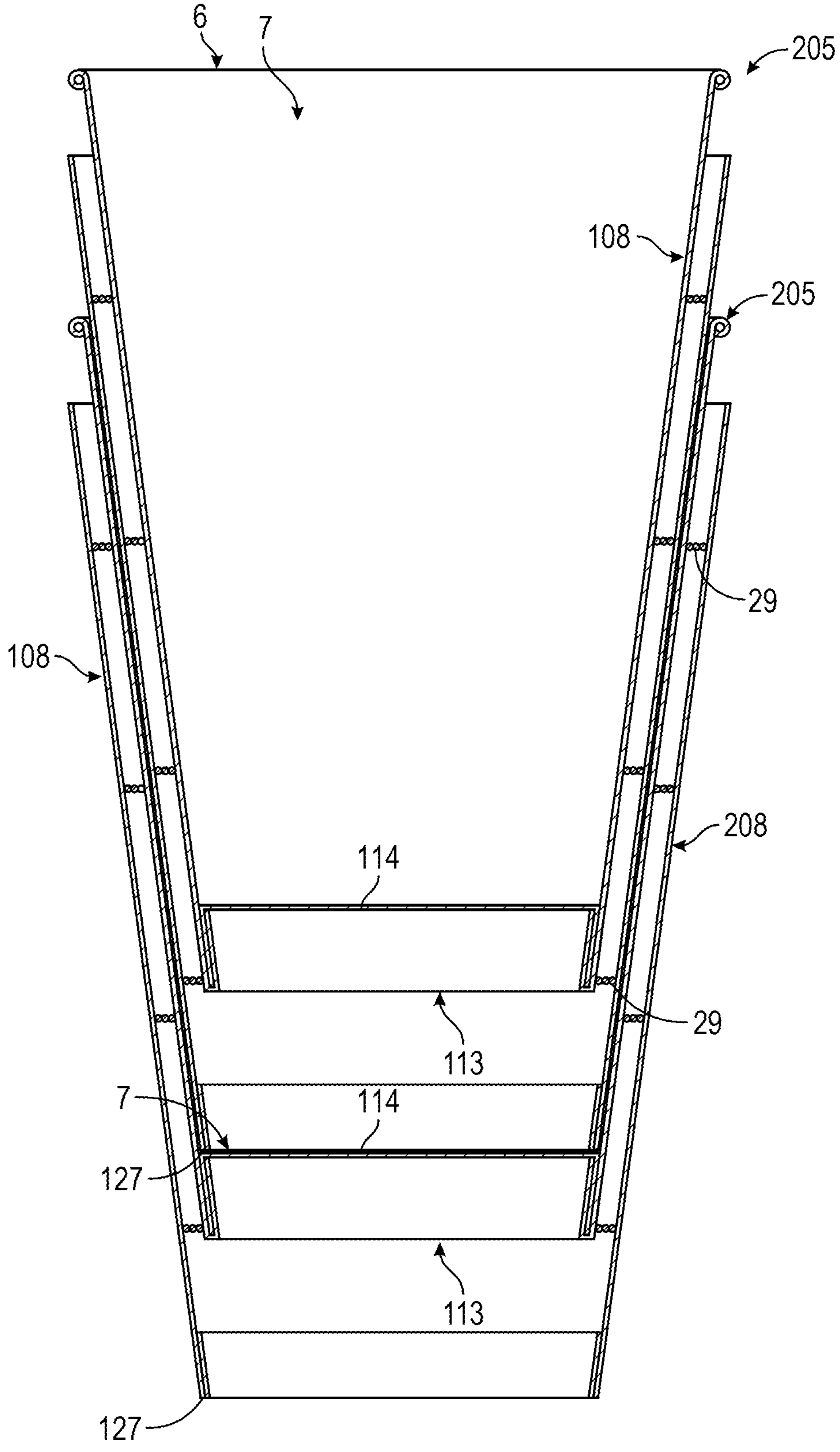
FIG. 10 is a schematic cross-sectional view of a pair of containers, each as shown in FIG. 8 in a nested arrangement.
Figure 10A:
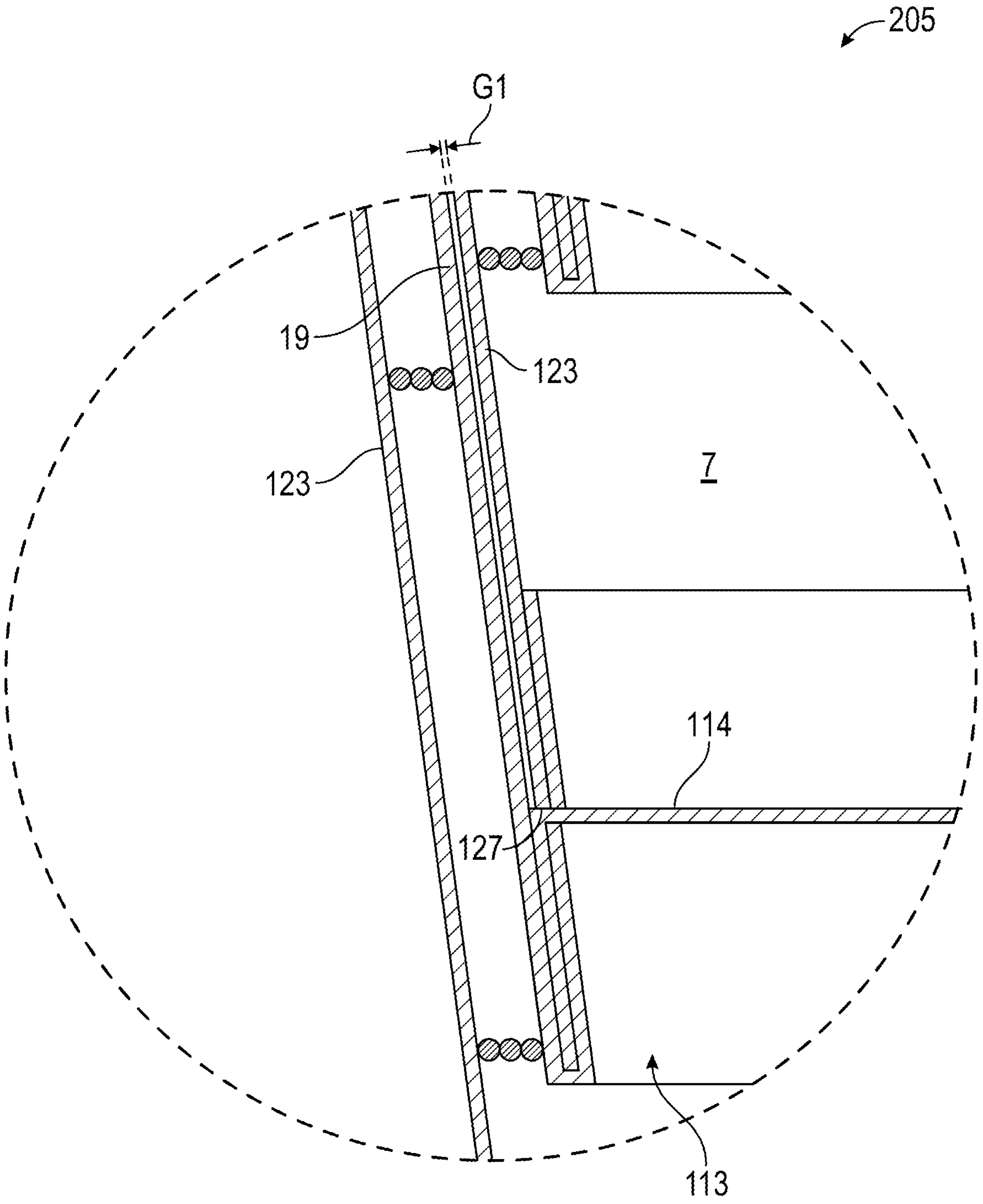
FIG. 10A is an enlarged portion of FIG. 10.
Figure 10B:
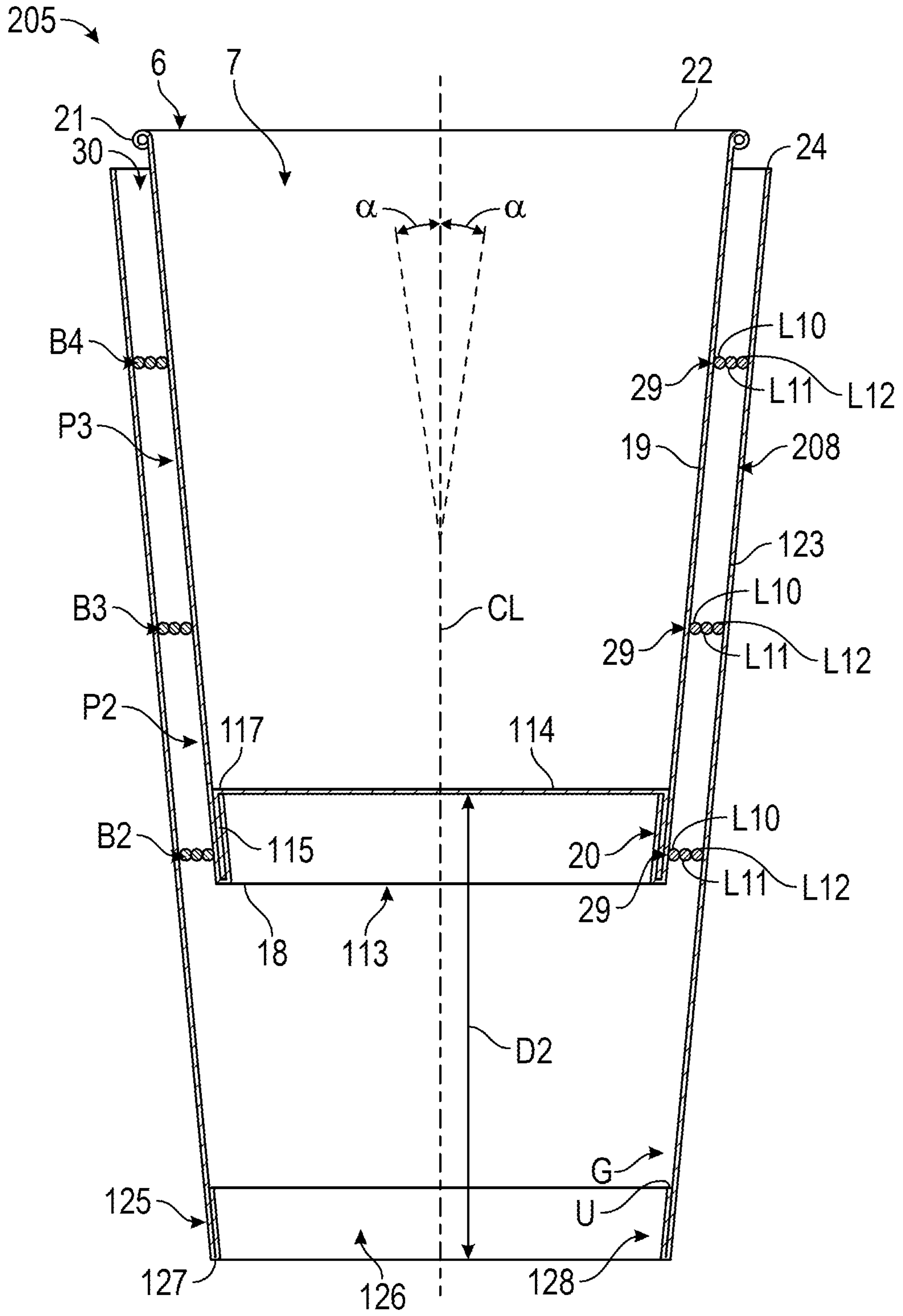
FIG. 10B is a view similar to FIG. 8 with a closed bottom of the container at an alternative position.

As shown in FIG. 8, the container 205 is shown with the bottom panel 114 of the closed bottom 113 positioned at a distance D1 from the lower edge 127 of the container. As shown in FIG. 10B, the container is illustrated with the bottom panel 114 of the closed bottom 113 in a raised positioned relative to FIG. 8, so that the bottom panel 114 is positioned at a distance D2 from the lower edge 127 of the container. In embodiment, D1 and D2 can be at least about ⅝ inch, or D1 and D2 can be in the range of at least about ⅝ inch to about 1.25 inches without departing from the disclosure. It will be understood that the closed bottom 113 can be positioned at any desired vertical location of the sidewall construct 208 having a constant angle α to provide an interior volume corresponding to a desired fluid size for the container 205. In this regard, at least the configuration and/or location of the bottom 113 of containers formed from the sidewall construct 208 allows for the interior volume of the containers to be selected by a user so as to provide the sidewall construct 208 and containers formed therefrom with scalable features.

As with the previous embodiments, the container 205 has features that allow for "bottom nesting". As shown in FIGS. 10 and 10A, the angle α of the sidewall construct 208 can be selected such that the lower edge 127 of a respective upper container 205 engages the respective bottom panel 114 of a respective lower receiving container 205 prior to substantial frictional engagement of the sidewall constructs 208 of the respective containers 205, so that respective containers 205 can be easily separated or otherwise de-nested from one another. As shown in the nested arrangement of FIGS. 10 and 10A, the lower edge 127 of the upper container 205 is in contact with the bottom panel 114 of the lower container while an air gap G1 is maintained between the outer sleeve 123 of the inner container and the inner sidewall 19 of the lower container. The presence of the air gap G1 in the nested configuration prevents taper locking of the upper and lower containers 205 and allows easy separation of the upper and lower containers 205 from the nested configuration of FIGS. 10 and 10A. In one embodiment, the container 205 can include surface features to facilitate separation or de-nesting, for example, embossed and/or embossed surfaces. Such an arrangement of the containers 205 can provide significant space savings for transport and/or storage of the containers 205. In one embodiment, the angle α can be approximately 7.3 degrees, or the angle α could be in the range of about 2 degrees to about 10 degrees.

Referring additionally to FIGS. 11-13B, a container 305 is illustrated according to a fourth exemplary embodiment of the disclosure. It will be understood that the container 305 is similar to the container 205 of the third embodiment, except the container 305 includes a sidewall construct 308 with the bands B1, B2, B3, B4 of each spacer 29 between the inner sidewall 19 and the outer sleeve 123 comprising four layers of adhesive L13, L14, L15, L16. One or more portions of the container 305 are substantially similar to that of the containers 5, 105, 205 of the first, second, and third exemplary embodiments of the disclosure, and like or similar reference numbers will refer to such like or similar elements.

Figure 11:
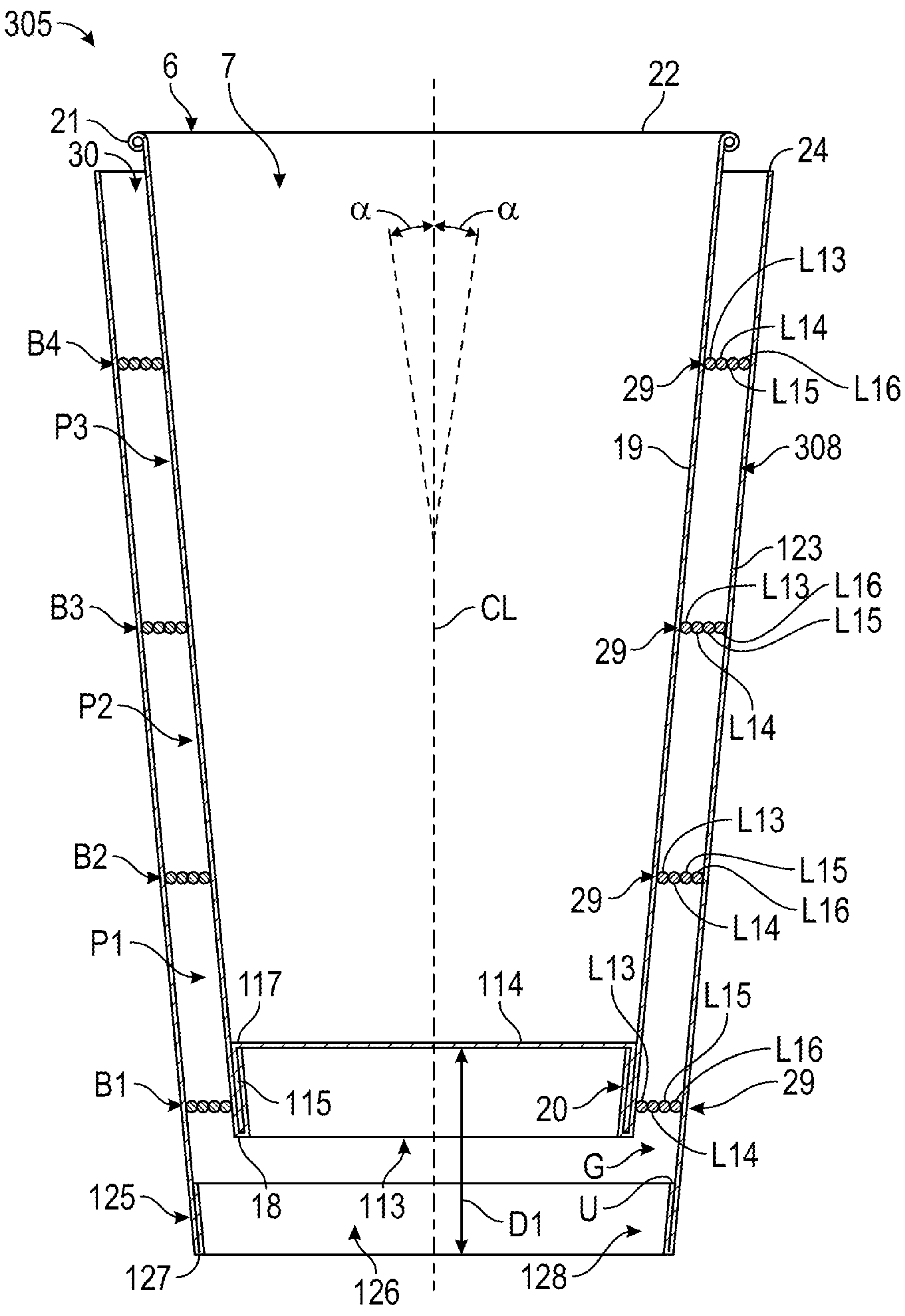
FIG. 11 is a schematic cross-sectional view of a container according to a fourth exemplary embodiment of the disclosure.
Figure 12:
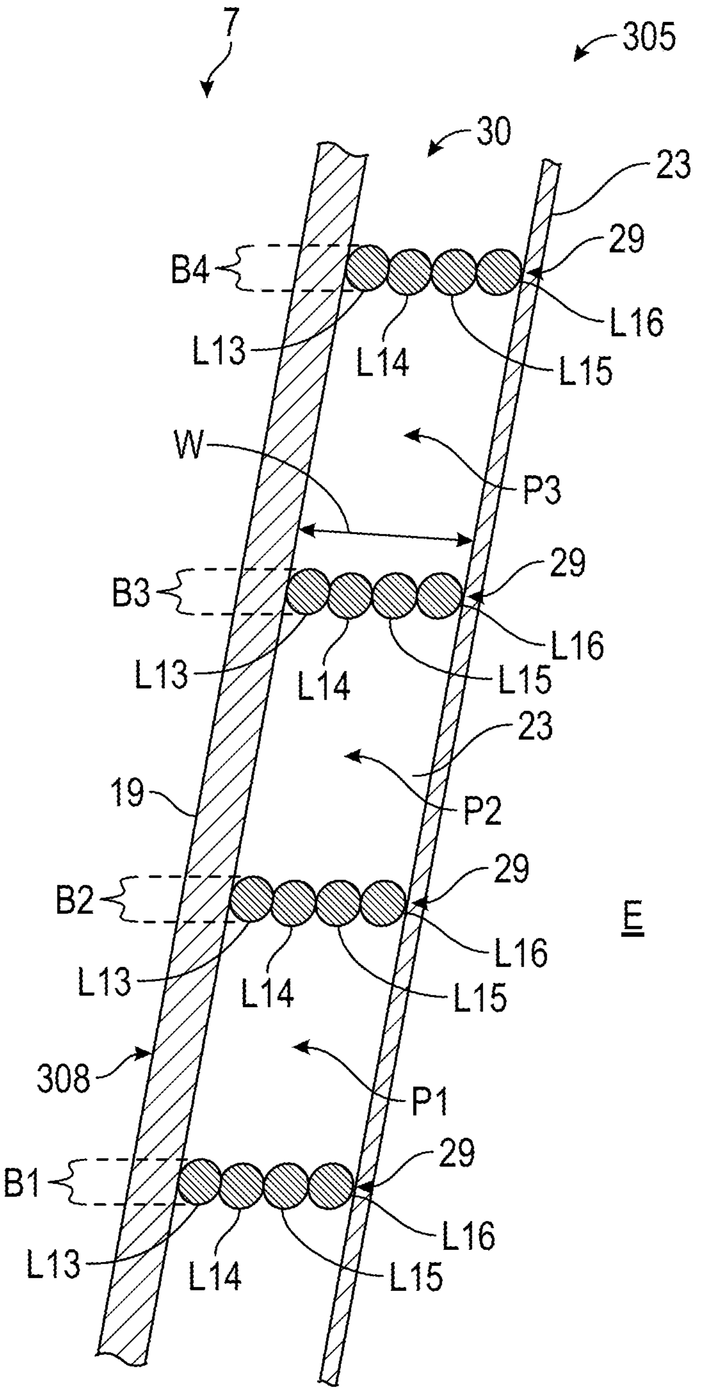
FIG. 12 is a schematic cross-sectional view of a portion of a sidewall construct of the container of FIG. 11.

In the embodiment of FIG. 11, the inner layer of adhesive L13 is in contact with the inner sidewall 19, the first middle layer of adhesive L14 is adjacent and in contact with the inner layer of adhesive L13, the second middle layer L15 of adhesive is adjacent and in contact with the first middle layer of adhesive L14, and the outer layer of adhesive L16 is adjacent and in contact with the second middle layer of adhesive L15 and the outer sleeve 123. The combined width of the four layers of adhesive L13, L14, L15, L16 from the inner sidewall 19 to the outer sleeve 123 comprises the spacing or width W of the pockets P1, P2, P3 of the insulating features of the container 305. The insulating features and the container 305 could be otherwise shaped, arranged, and/or configured without departing from the disclosure.

The container 305 includes a similar closed bottom 113 as the container 205 in that the container 305 is also scalable with the bottom panel 113 positionable at various distances D1, D2 from the lower edge 127 of the container 305. The container 305 could have other bottom features without departing from the disclosure.

Figure 13:
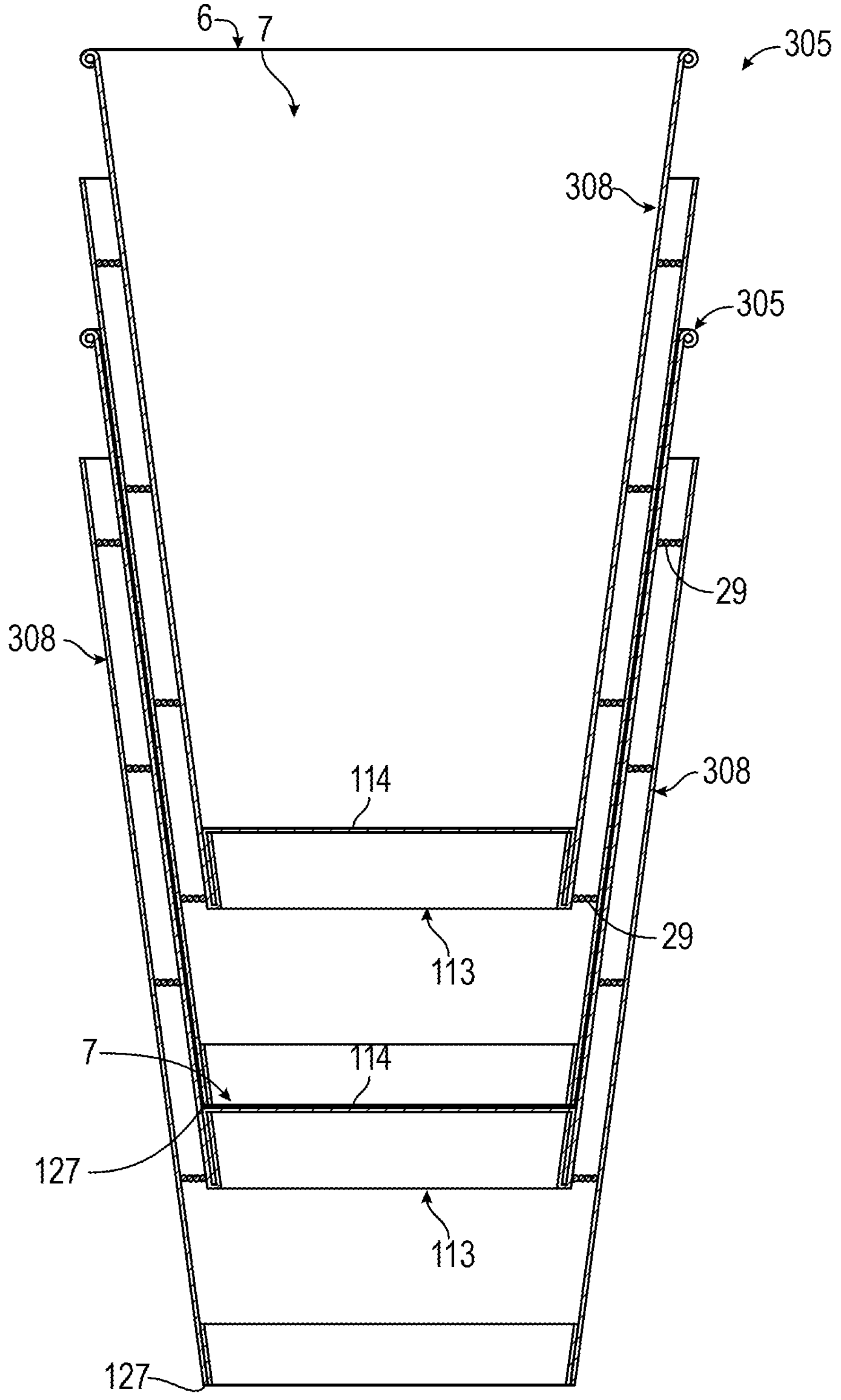
FIG. 13 is a schematic cross-sectional view of a pair of containers, each as shown in FIG. 11 in a nested arrangement.
Figure 13A:
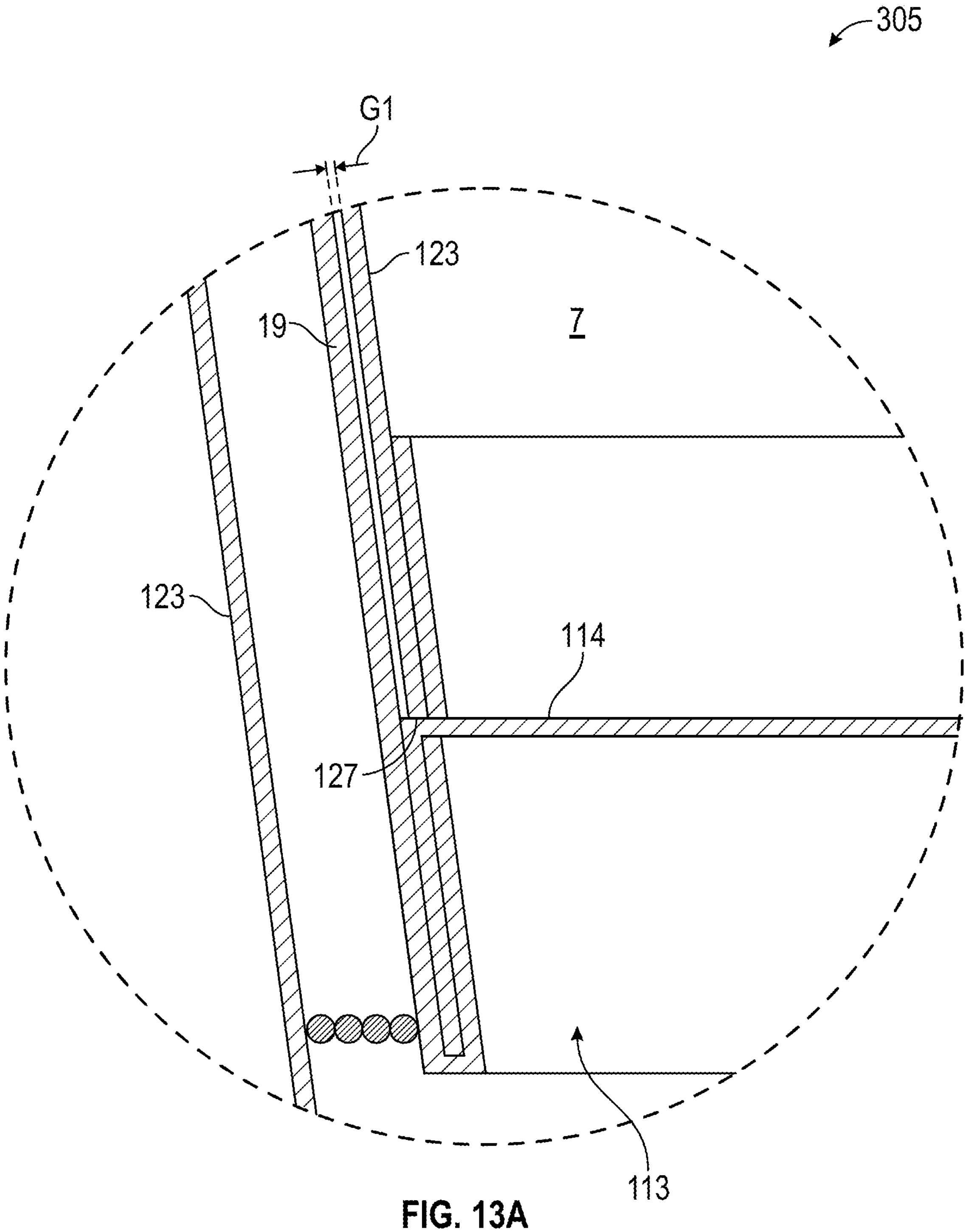
FIG. 13A is an enlarged portion of FIG. 13.
Figure 13B:
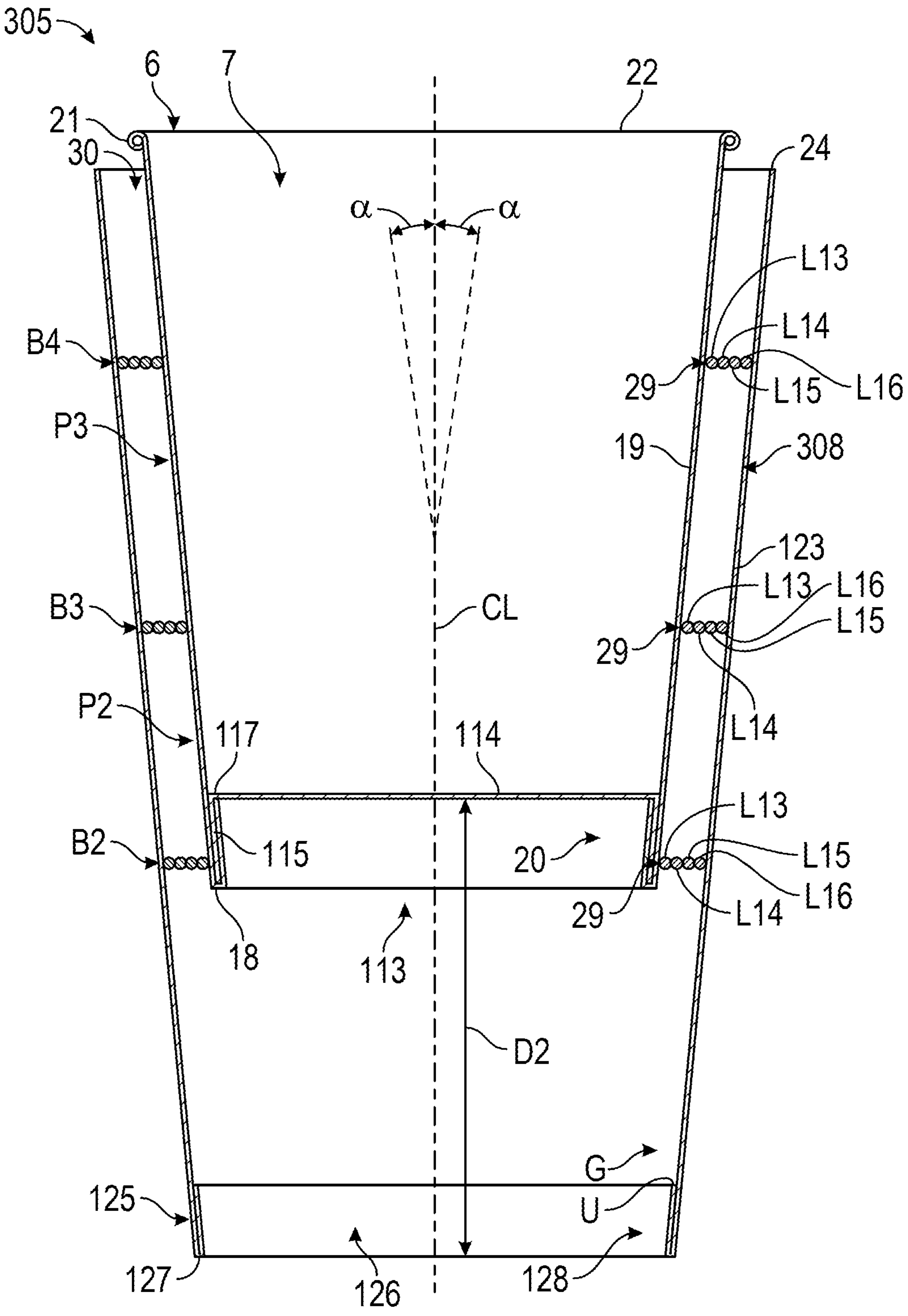
FIG. 13B is a view similar to FIG. 11 with a closed bottom of the container at an alternative position.

As shown in FIGS. 13, and 13A, the container 305 has features that allow for "bottom nesting" in a similar manner as the containers 105, 205, with the angle α of the sidewall construct 308 being selected such that the lower edge 127 of a respective upper container 305 engages the respective bottom panel 114 of a respective lower receiving container 305 prior to substantial frictional engagement of the sidewall constructs 308 of the respective containers 305, so that respective containers 305 can be easily separated or otherwise de-nested from one another. As shown in the nested arrangement of FIGS. 13 and 13A, the lower edge 127 of the upper container 305 is in contact with the bottom panel 114 of the lower container while an air gap G1 is maintained between the outer sleeve 123 of the inner container and the inner sidewall 19 of the lower container. The presence of the air gap G1 in the nested configuration prevents taper locking of the upper and lower containers 305 and allows easy separation of the upper and lower containers 305 from the nested configuration of FIGS. 13 and 13A. In one embodiment, the container 305 can include surface features to facilitate separation or de-nesting, for example, embossed and/or embossed surfaces. Such an arrangement of the containers 305 can provide significant space savings for transport and/or storage of the containers 305. In one embodiment, the angle α can be approximately 7.3 degrees, or the angle α could be in the range of about 2 degrees to 10 degrees.

The containers 5, 105, 205, 305 can have various dimensions and features that allow for enhanced insulating features as well as bottom nesting of the closed bottom in a stacked arrangement of the containers (FIGS. 7A, 7B, 7C, 10, 10A, 13, 13A). For example, the insulating features such as the pockets P1, P2, P3, P4 can have a width W in the range of between about 60 mils and about 120 mils, for example, about 60 mils, about 70 mils, about 80 mils, about 90 mils, about 100 mils, about 110 mils, about 120 mils, etc. or integer or non-integer numbers therebetween. In one embodiment, the width W can be about 80 mils. In one embodiment, the angle α can be in the range of about 2 degrees to about 10 degrees, for example about 7 degrees, about 7.3 degrees, or any angle therebetween. The bottom panel 114 of the closed bottom 113 can be spaced from the lower edge 127 of the container a distance D1, D2 in the range of about 0.625 inches to about 1.25 inches. In one embodiment, the distance D1, D2 is approximately 0.9 inches. The containers 5, 105, 205, 305 can have other dimensions than listed herein, as the dimensions herein are exemplary of suitable embodiments of containers having insulating features and bottom nesting features.

FIGS. 14-23 illustrate various systems, processes, methods, machines, apparatus, components, and forming machines for forming any of the containers 5, 105, 205, 305 of the present disclosure.

Figure 14:
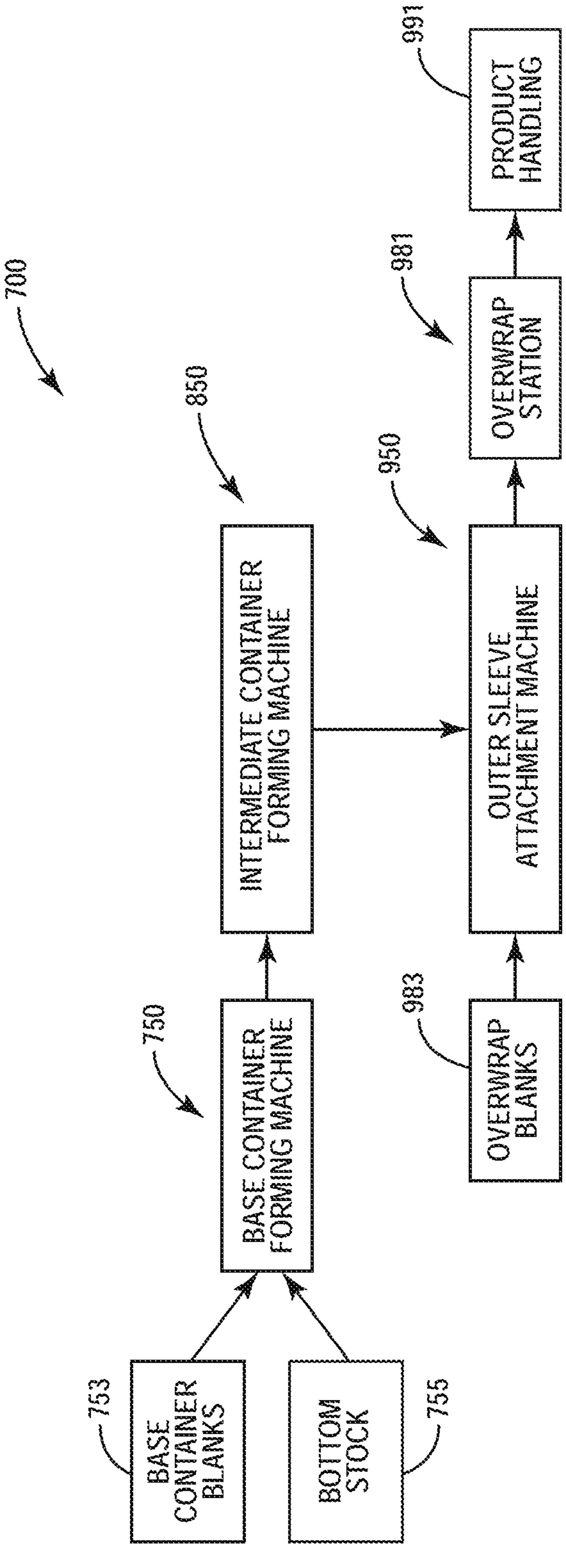
FIG. 14 is a process flow illustrating a system for forming containers according to an exemplary embodiment of the present disclosure.
Figure 15:
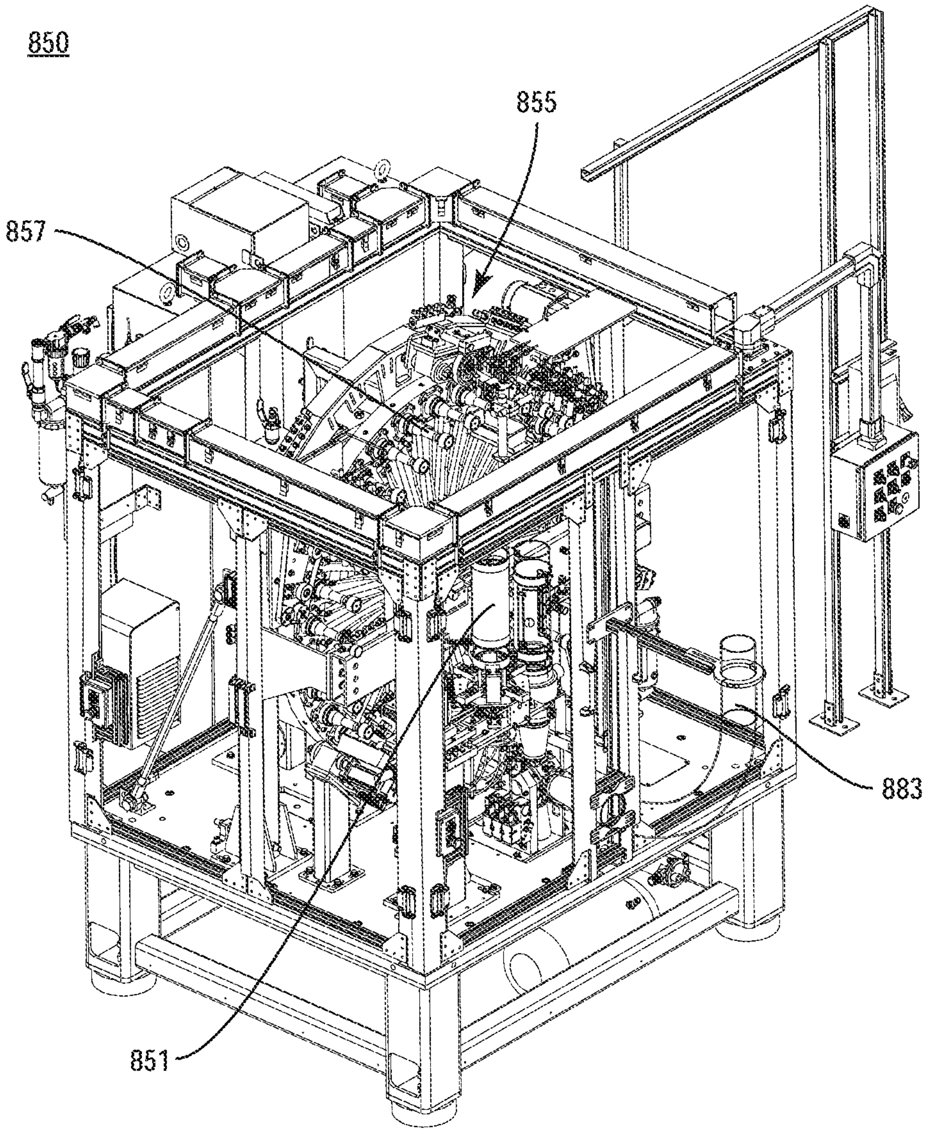
FIG. 15 is a perspective view of an intermediate container forming machine of the system of FIG. 14 according to an exemplary embodiment of the disclosure.
Figure 16:
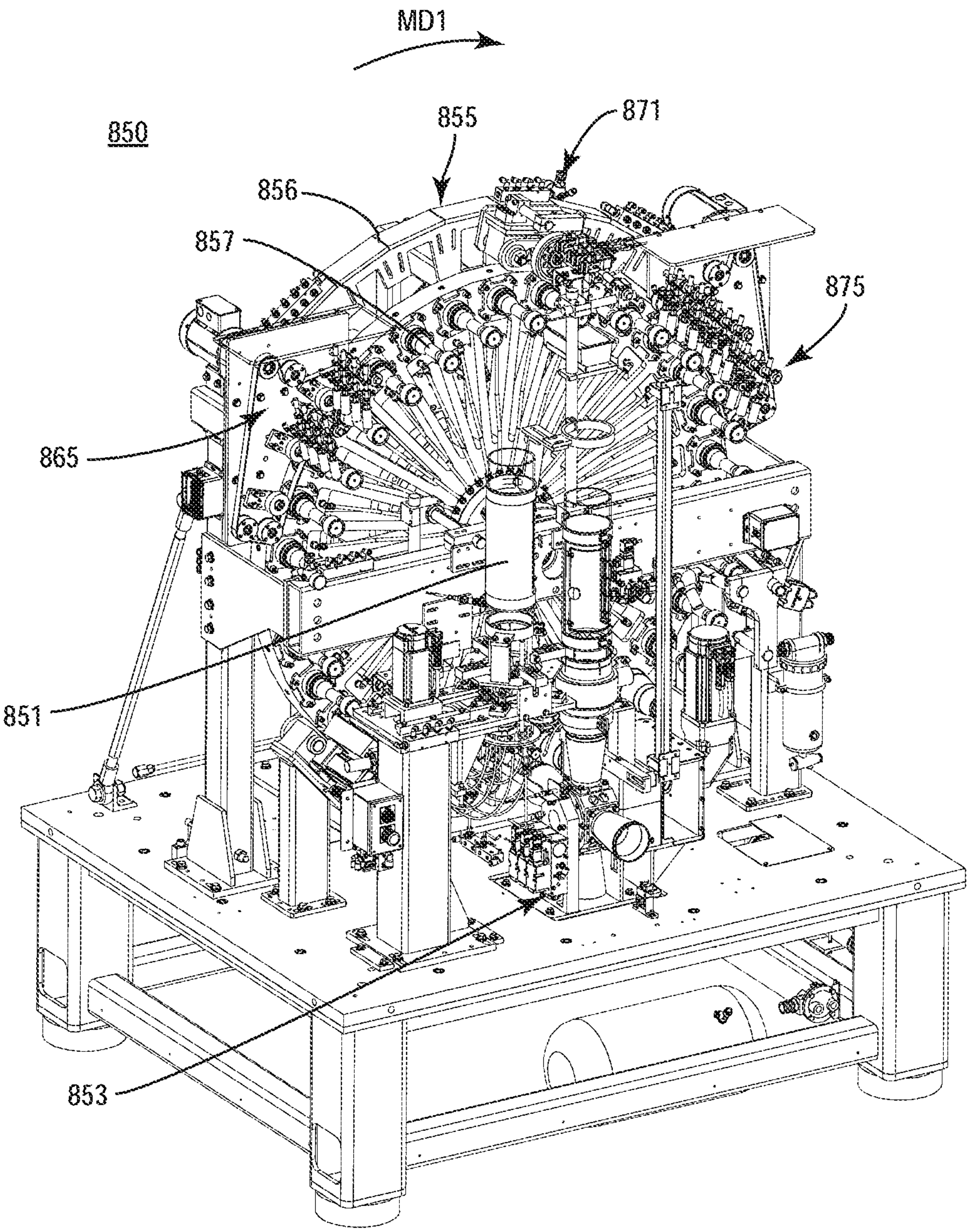
FIG. 16 is a perspective view of an isolated portion of the intermediate container forming machine of FIG. 15 according to an exemplary embodiment of the disclosure.
Figure 17:
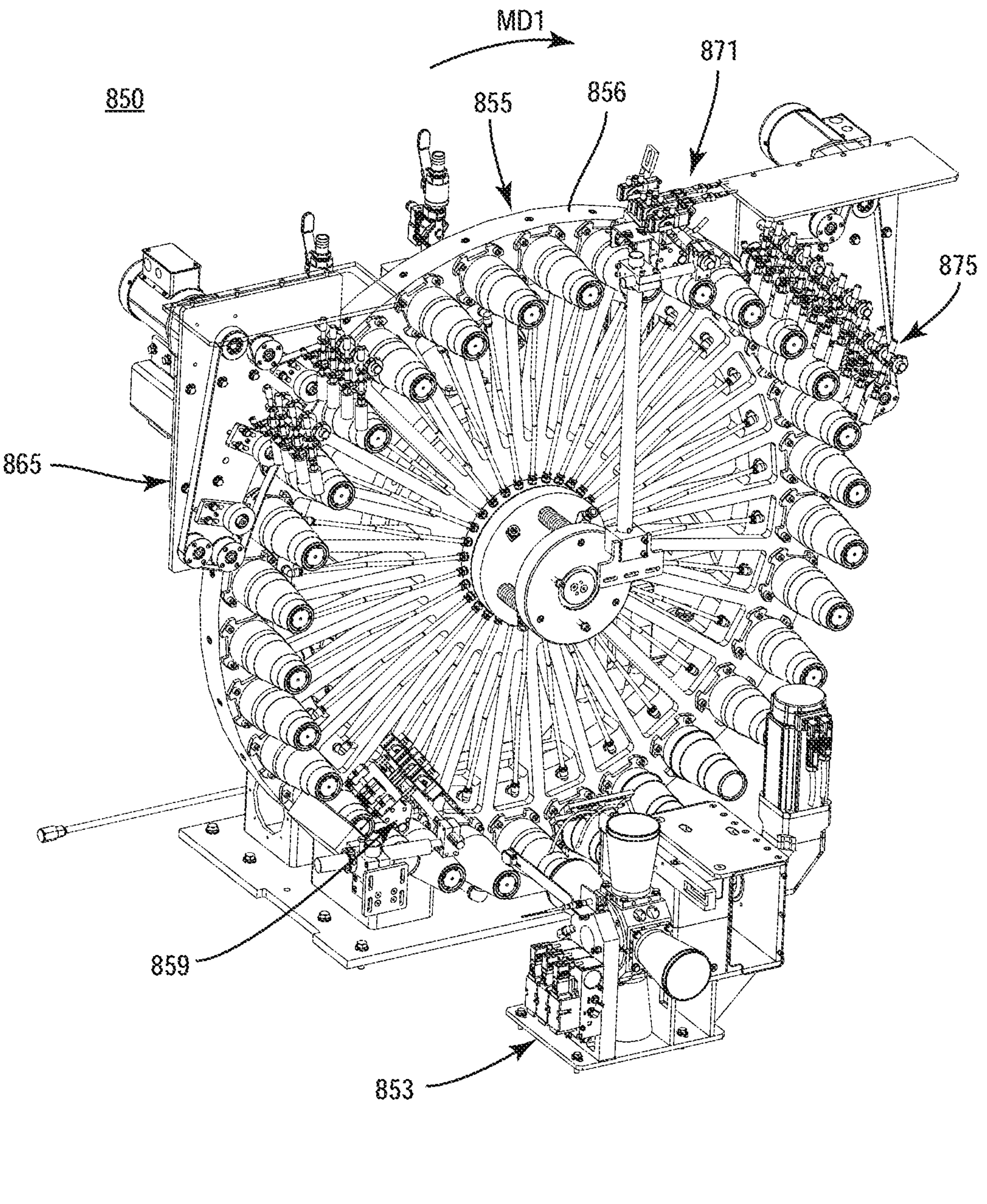
FIG. 17 is a perspective view of an isolated portion of the intermediate container forming machine of FIG. 15 in operation according to an exemplary embodiment of the disclosure.
Figure 18:
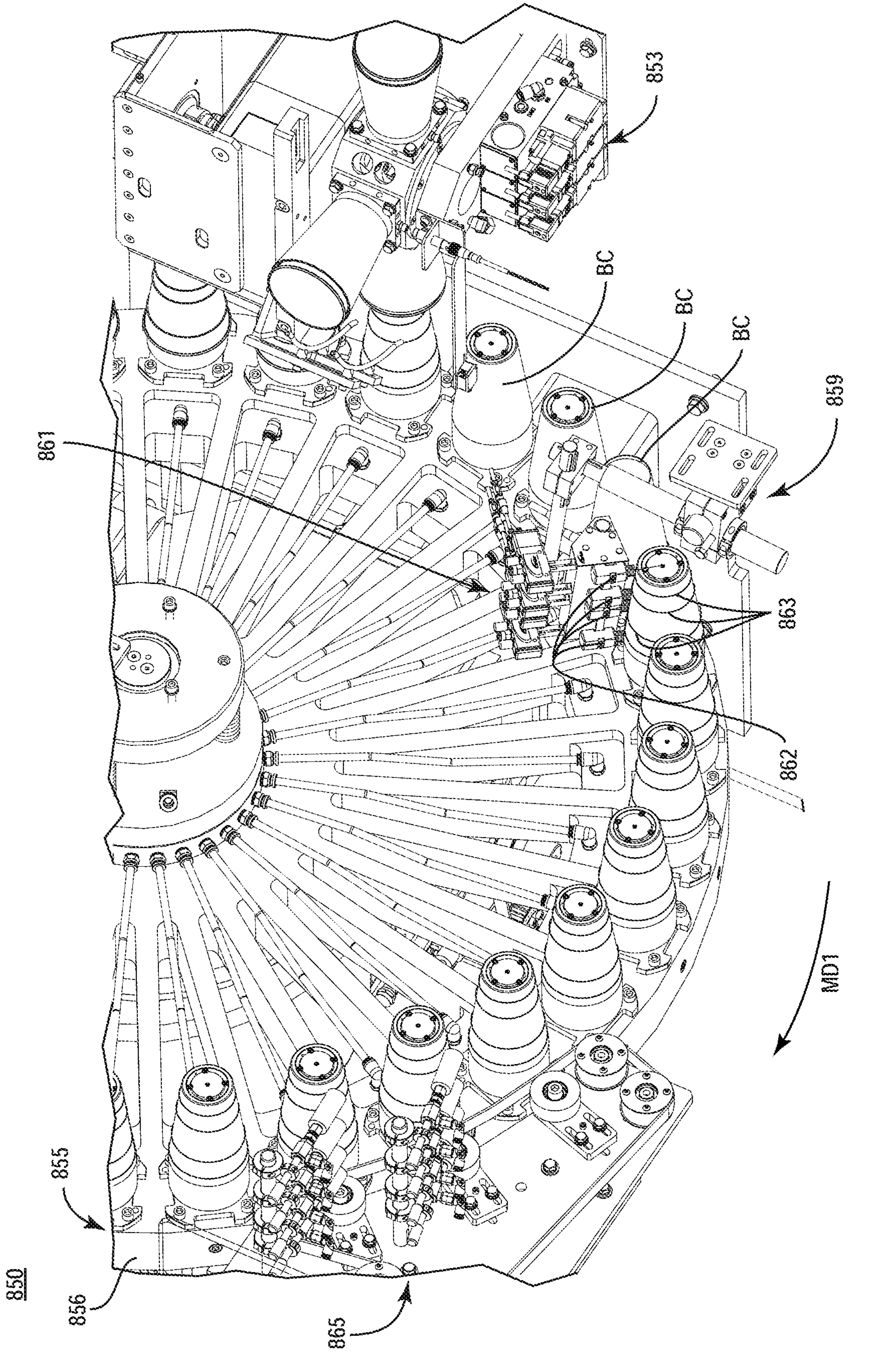
FIG. 18 is an enlarged view of a portion of FIG. 17.
Figure 19:
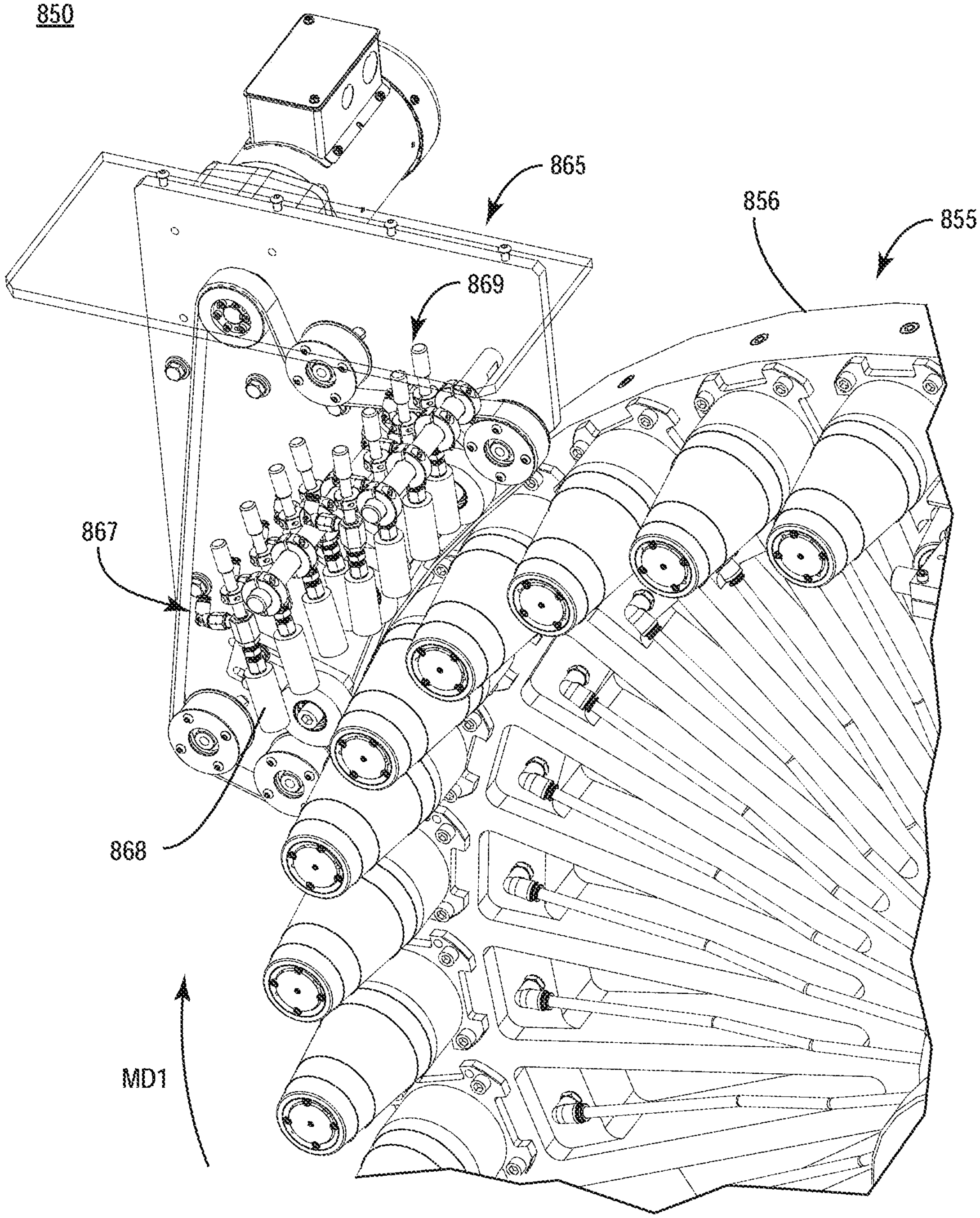
FIG. 19 is an enlarged view of another portion of FIG. 17.
Figure 20:
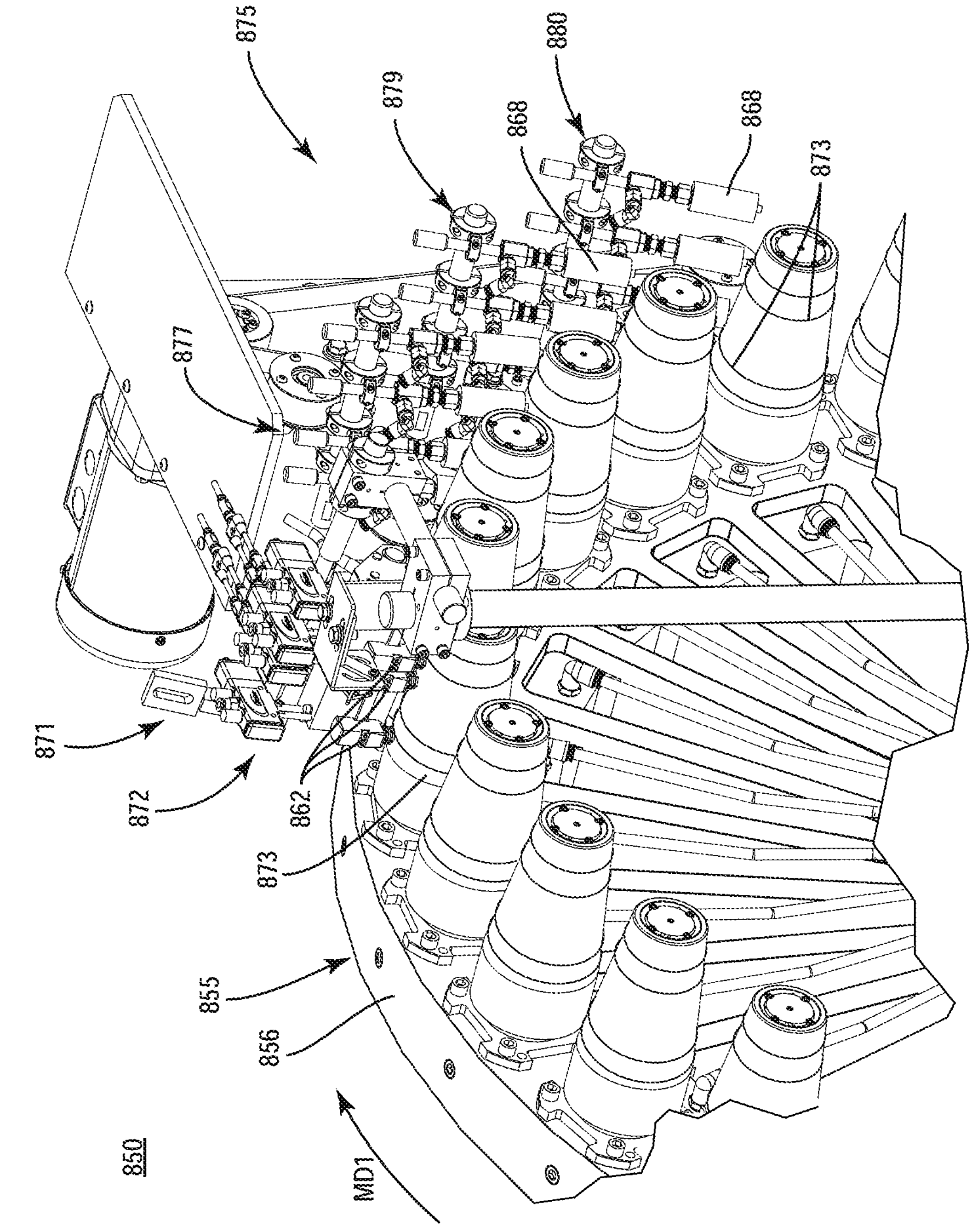
FIG. 20 is an enlarged view of another portion of FIG. 17.

FIG. 14 shows a schematic flow diagram of a system 700 for forming various containers 5, 105, 205, 305 for containing a cold fluid of the present disclosure. The system 700 includes a base container forming machine 750 for forming a base container BC including the inner sidewall 19 and the closed bottom 13, 113 secured to the inner sidewall 19 to define the interior volume of the container 5, 105, 205, 305, an intermediate forming machine 850 that receives the base container BC from the base container forming machine and forms an intermediate container IC at least partially forming the glue beads that form the spacers 29 onto the base container BC, and an outer sleeve attachment machine 950 for receiving the intermediate container IC and attaching the outer sleeve 23, 123 to the intermediate container IC to complete the formation of the containers 5, 105, 205, 305. The system could include other machines, processes, components, etc., or the machines, processes, components, etc. shown and described herein could be modified or omitted without departing from the disclosure.

In some embodiments, one or more controllers can be provided in electrical communication with the system 700, e.g., via a wired and/or wireless electrical connection. Such controller can include a processor configured to implement one or more instructions stored on a non-transitory storage medium, and can be configured for operator input and/or manual control. In this regard, a controller can be or can form a part of a software program running on a computer, a programmable logic controller (PLC), another processor-implemented controller, or other control feature as will be understood by those skilled in the art. Such controller(s) can implement one or more processes of the system 700 and constituent machine(s) as described herein.

In one embodiment, the base container forming machine 750 can form base container blanks 753 into the inner sidewall 19 and form bottom stock 755 into the closed bottom 13, 113 of the base container BC. The base container forming machine 750 transmits the base containers BC to the intermediate container forming machine 850. The base container forming machine 750 can be a conventional container or cup forming machine such as the machines available from Paper Machinery Corporation of Milwaukee, Wisconsin, or other suitable container or cup forming machines without departing from the disclosure. For example, the base container forming machine 750 can be similar to the exemplary cup making machine or apparatus 10 described in U.S. Pat. No. 10,835,066, the entire disclosure of which is incorporated by reference herein as if presented herein in its entirety.

FIGS. 15-20 show various views and details of the intermediate container forming machine 850 according to an exemplary embodiment. In one embodiment, the intermediate container forming machine 850 includes a conveyor tube 851 that receives the base containers BC from the base container forming machine 750.

The intermediate container forming machine 850 can include a machine frame supporting the various assemblies and components thereof described herein. The machine frame can include one or more of bases, legs, struts, tie bars, platforms, etc., in various arrangements, to provide a supporting structure for the assemblies and components described herein. For example, the machine frame can support such components above a base surface such as a ground or floor, and can provide access at one or more locations for human operators, to inspect, maintain, and/or otherwise operate the machine 850, e.g., control stations, panels, terminals, etc.

The intermediate container forming machine 850 includes a turret assembly 855 that is rotatably mounted in the machine and which has a turret body 856 supporting a plurality of mandrels 857 protruding therefrom for receiving a respective base container BC from the conveyor tube 851. In some embodiments, one or more of the mandrels 857 can have a rod-like configuration. In some embodiments, one or more of the mandrels 857 can have a frustoconical configuration that approximates an interior volume of a respective container 5, 105, 205, 305.

As described herein, the turret assembly 855 can rotate in a machine direction MD1 (clockwise in the view of FIGS. 15-20) to move the base containers BC mounted on a respective mandrel 857 through various forming stations in the intermediate container forming machine 850. Furthermore, the respective mandrels 857 can be rotatably mounted about the turret body 856 so as to be rotatable relative thereto. In some embodiments, one or more of the mandrels 857 can be rotatably fixed to the turret body 856.

In this regard, the turret assembly 855 can be in mechanical communication with one or more actuators and/or actuating mechanisms, e.g., motors, pneumatic actuators, hydraulic actuators, etc., that can be either directly coupled to one or more portions of the turret assembly 855 or via one or more mechanical transmissions. Such actuators and/or actuating mechanisms can independently or collectively drive the turret body 856 and mandrels 857 to rotate in the manner described herein. In some embodiments, one or more rotational driving members, e.g., belts, pulleys, etc., can be driven and positioned for contact with one or more base containers BC positioned about a respective mandrel 857 to cause rotation thereof.

In one embodiment, the intermediate container forming machine 850 includes a first material application station or first adhesive application station 859 that includes a first material applicator or first adhesive applicator 861 that applies the first layer of glue beads 863 that form the spacers 29 of the finished container 5, 105, 205, 305. The first adhesive applicator 861 can include a plurality of spaced apart adhesive applicator members 862 that can be configured to selectively eject adhesive such as glue therefrom. In some embodiments, the adhesive applicator members 862 can define interior channels through which at least partially heated or melted glue can flow, for example, under the influence of gravity and/or under pressure from a pressure sources such as an actuator. The glue can exit the respective adhesive applicator members 862 through an opening, nozzle, etc. While the first adhesive applicator 861 illustrates a set of four spaced apart adhesive applicator members 862, it will be understood that a different number and/or arrangement of adhesive applicator members 862 can be provided without departing from the disclosure.

As glue is discharged from the respective adhesive applicator members 862 of the first adhesive applicator 861, the respective mandrel 857 at least partially received in the respective base container BC can be driven to rotate so that each glue bead 863 is applied 360 degrees around the base container BC. In some embodiments, the respective base container BC can be driven to rotate about the respective mandrel 857.

After the first glue beads 863 are applied, the turret body 856 can be driven to rotate to move the respective base container BC to a first cooling station 865 that applies air to the first layer of glue beads 863 to cool the beads 863. The first cooling station 865 includes a first air applicator 867 and second air applicator 869 that applies compressed air to the first glue bead 863 as the base container BC is rotated. Each air applicator 867, 869 can include a plurality of air applicator members 868 that can define a fluid path in communication with an air source of other fluid source, e.g., a blower or other pressurized fluid source.

In some embodiments, air or other fluids associated with one or more of the air applicator members 868 can be provided in fluid communication with one or more heating and/or cooling units so as to provide air or other fluids through the respective air applicator members 868 at a desired temperature. In some embodiments, one or more of the air applicator members 868 can include a respective nozzle, opening, or port for directing exiting air or other fluids toward the respective glue beads 863.

In some embodiments, the first glue beads 863 can be aged and cooled for between approximately 0.2 seconds and approximately 12 seconds, but this time may vary outside of this range without departing from the disclosure. Such aging and cooling of the glue beads 863 can include one or both of drying and curing of the adhesive that forms the glue beads 863. While the first air applicator 867 and the second air applicator 869 each illustrate a set of four spaced apart air applicator members 868, it will be understood that a different number and/or arrangement of air applicator members 868 can be provided without departing from the disclosure.

Next the turret body 856 can be driven to rotate so as to index a respective base container BC to a second material application station or second adhesive application station 871. The second adhesive application station 871 includes a second material applicator or second adhesive applicator 872 that applies the second layer of glue beads 873 that form the spacers 29 of the various containers 5, 105, 205, 305. The second adhesive applicator 872 can have the same general configuration of the first adhesive applicator 861 described above, e.g., so as to have the configuration and arrangement of adhesive applicator members 862 described above.

As described above with the first adhesive applicator 861, the respective mandrel 857 can be driven to rotate the base container BC disposed thereabout so that the second adhesive applicator 871 applies the second layer of glue beads 873 in a 360 degree pattern around the base container BC. In the illustrated embodiment, the second layer of glue beads 873 are applied on top of the first layer of glue beads 863 after the first layer of glue beads 863 has been aged and cooled.

After the second glue beads 873 are applied, the turret body 856 can again be driven to rotate to move the respective base container BC to a second cooling station 875 that applies air to the second layer of glue beads 873 to cool the beads. In one embodiment, the second cooling station 875 includes a first air applicator 877, a second air applicator 879, and a third air applicator 880 that applies compressed air to the second glue bead 873 as the mandrel 857 about which the respective base container BC is disposed is driven to rotate.

The first air applicator 877 and the second air applicator 879 of the second cooling station 875 can have a configuration similar to that of the first air applicator 867 and second air applicator 869 of the first cooling station 865, e.g., so as to include the configuration and arrangement of air applicator members 868 described above. Furthermore, the third air applicator 880 of the second cooling station 875 can have a configuration similar to that of the air applicators 867, 869, 877, 879.

In one embodiment, the second glue beads 873 are aged and cooled for between approximately 0.2 seconds and approximately 12 seconds, but this time may vary outside of this range without departing from the disclosure. After the second glue beads 873 have been aged and cooled, the base container BC is transformed into the intermediate container IC that is conveyed to the outer sleeve attachment machine 950 for further processing and forming into the formed containers 5, 105, 205, 305.

In the illustrated embodiment, the turret body 856 is further driven to rotate so as to index the respective intermediate container IC to a discharge station 881 that includes a cup positioning apparatus 853 that is configured to selectively orient intermediate containers IC received from a respective mandrel 857 to exit the intermediate container forming machine 850. In this regard, the cup positioning apparatus 853 can include at least an inlet port positioned adjacent the turret assembly 855, and a discharge port in communication with a discharge tube 883, as described further below. In some embodiments, the cup positioning apparatus 853 can include one or more actuators in mechanical communication with a respective engagement feature for grasping and moving, e.g., via tilting, turning, rotating, translating, etc., a respective intermediate container IC.

The discharge tube 883 can be configured to discharge the intermediate containers IC (the base containers BC with the first and second glue beads 863, 873 applied) from the turret assembly 855 to the outer sleeve attachment machine 950, for example, under a hydraulic or pneumatic pressure source, or other actuating mechanism.

Figure 21:
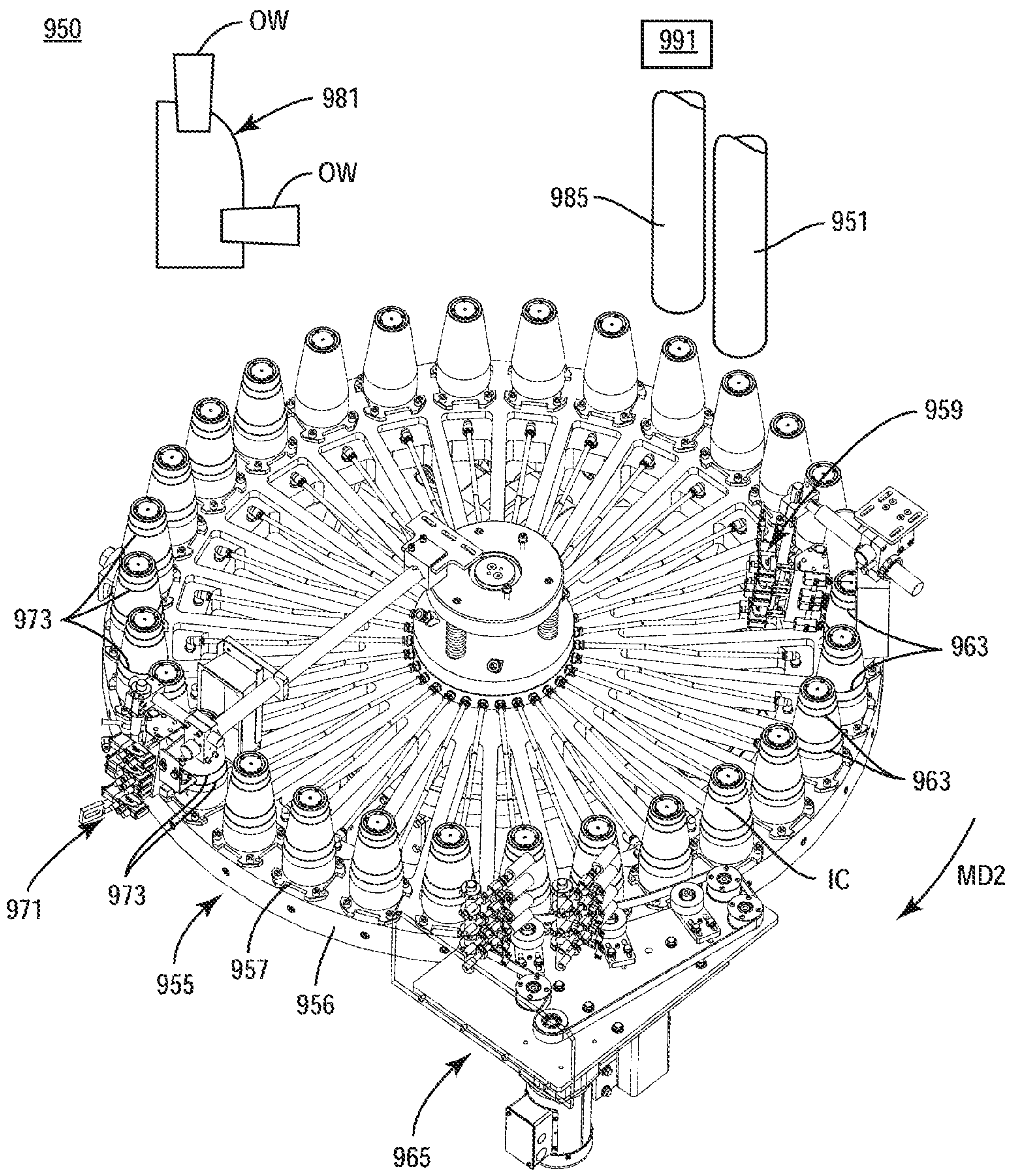
FIG. 21 is a perspective view of an outer sleeve attachment machine of the system of FIG. 14 and in operation according to an exemplary embodiment of the disclosure.
Figure 22:
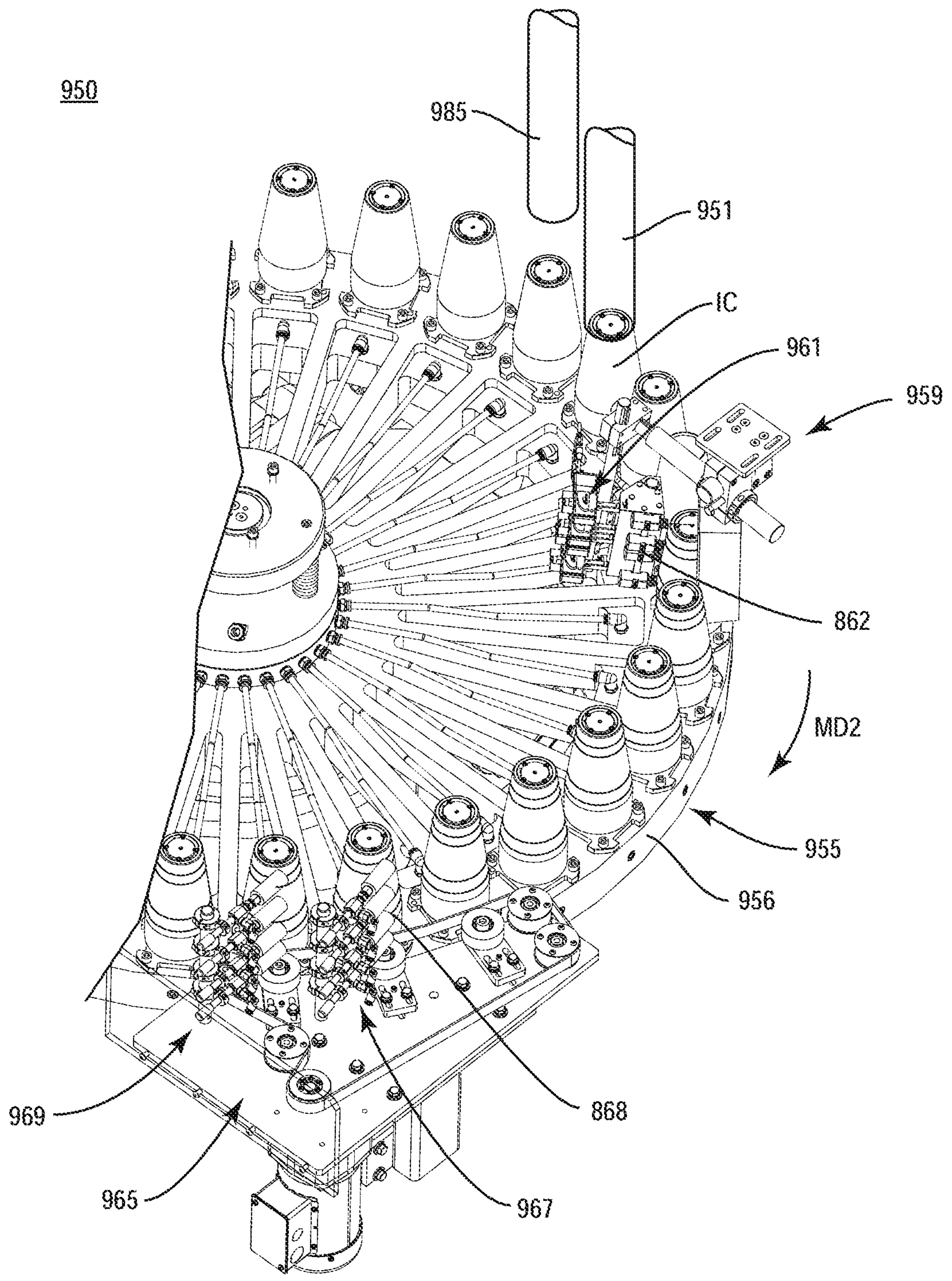
FIG. 22 is an enlarged view of a portion of FIG. 21.
Figure 23:
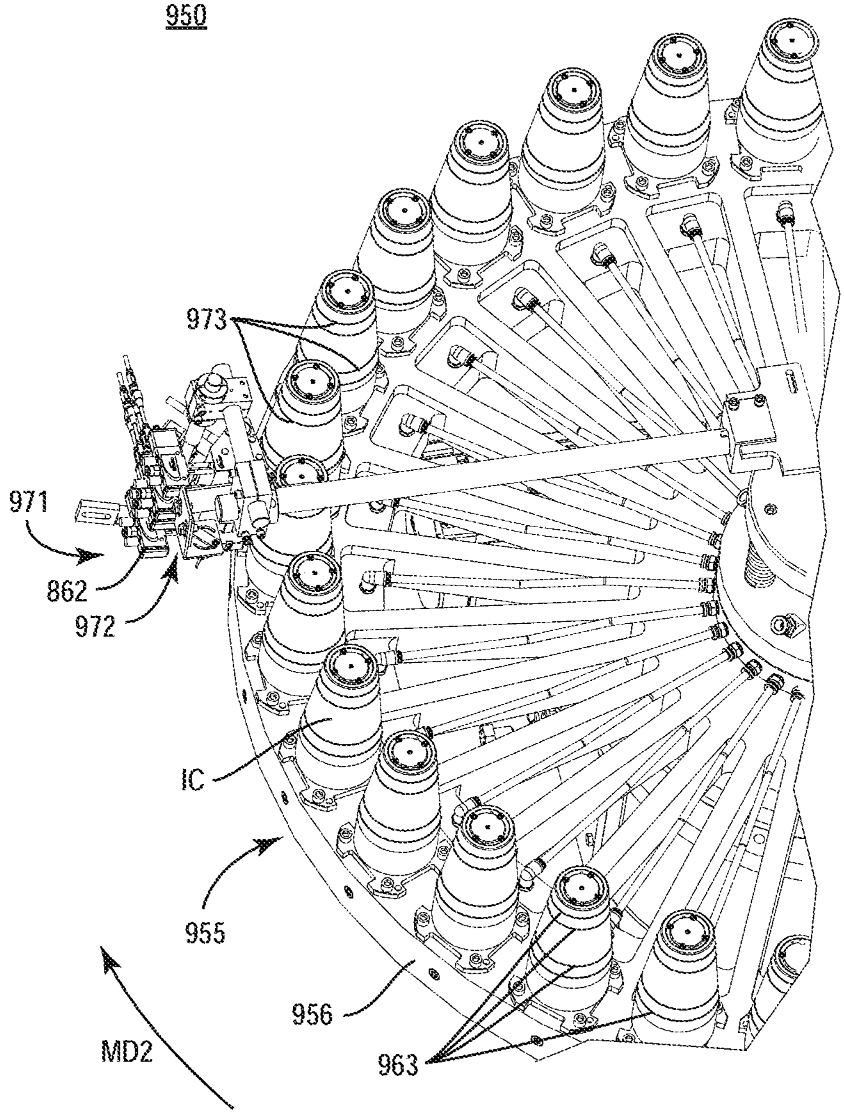
FIG. 23 is an enlarged view of another portion of FIG. 21.

With additional reference to FIGS. 21-23, the outer sleeve attachment machine 950 can include an inlet station 951 that receives the intermediate containers IC that are conveyed from the discharge station 881/discharge tube 883 of the intermediate container forming machine 850. Such inlet station 951, in some embodiments, can include an inlet tube. It will be understood that the outer sleeve attachment machine 950 can include any number of frames, supports, platforms, etc.

The turret assembly 955 of the outer sleeve attachment machine 950 can have a configuration similar to that of the turret assembly 855 of the intermediate container forming machine 850 described above, e.g., so as to include a turret body 956 that is rotatably mounted in the outer sleeve attachment machine and which has a plurality of mandrels 957 rotatably mounted thereto and protruding therefrom for receiving a respective intermediate container IC from the inlet station 951.

However, in the illustrated embodiment, the turret assembly 955 of the outer sleeve attachment machine 950 can be oriented differently than that of the turret assembly 855 of the intermediate container forming machine 850 described above. For example, the turret body 956 of the turret assembly 955 of the outer sleeve attachment machine 950 can be rotatably mounted along a plane that is generally perpendicular relative to a plane defined by the turret body 856 of the turret assembly 855 of the intermediate container forming machine 850 as described above. In some embodiments, the turret body 956 of the outer sleeve attachment machine 950 can have a generally circular arrangement with a diameter smaller than that of the turret body 856 of the turret assembly 855 of the intermediate container forming machine 850 described above, though the turret bodies 856, 956 can be similar without departing from the disclosure.

As with the turret assembly 855 of the intermediate container forming machine 850, the turret assembly 955 of the outer sleeve attachment machine 950 can be in mechanical communication with one or more actuators and/or actuating mechanisms, e.g., motors, pneumatic actuators, hydraulic actuators, etc., that can be either directly coupled to one or more portions of the turret assembly 955 or via one or more mechanical transmissions. Such actuators and/or actuating mechanisms can independently or collectively drive the turret body 956 and mandrels 957 to rotate in the manner described herein. In some embodiments, one or more rotational driving members, e.g., belts, pulleys, etc., can be driven and positioned for contact with one or more intermediate containers IC positioned about a respective mandrel 957 to cause rotation thereof.

The turret assembly 955 can be driven to rotate in a machine direction MD2 (clockwise in the view of FIGS. 21-23) to move the intermediate containers IC mounted on a respective mandrel 957 through various forming stations in the outer sleeve attachment machine 950.

In one embodiment, the outer sleeve attachment machine 950 includes a third material application station or third adhesive application station 959 that includes a third material applicator or third adhesive applicator 961 that applies a third layer of glue beads 963 that form the spacers 29 of the finished container 205, 305. The third adhesive applicator 961 can have the same general configuration as the first adhesive applicators 861, 871 described above, e.g., so as to have the configuration and arrangement of adhesive applicator members 862 described above.

As glue is discharged from the third adhesive applicator 961, the respective mandrel 957 is driven to rotate such that the respective intermediate container IC disposed thereabout is rotated so that each glue bead 963 is applied 360 degrees around the intermediate container IC. The third glue beads 963 are applied on the surface of the second glue beads 873.

After the third glue beads 963 are applied, the turret body 956 can be driven to rotate to move the respective intermediate container IC to a third cooling station 965 that applies air to the third layer of glue beads 963 to cool the beads 963. In one embodiment, the third cooling station 965 includes a first air applicator 967 and second air applicator 969 that applies compressed air to the third glue beads 963 as the mandrel 957 about which the respective intermediate container IC is disposed is driven to rotate.

The first air applicator 967 and the second air applicator 969 of the third cooling station 965 can have a configuration similar to that of the first air applicators 867, 877 and second air applicators 869, 879 of the intermediate container forming machine 850 described above, e.g., so as to include the configuration and arrangement of air applicator members 868 described above.

In one embodiment, the third glue beads 963 are aged and cooled for between approximately 0.2 seconds and approximately 12 seconds, but this time may vary outside of this range without departing from the disclosure.

Next, the turret body 956 can be driven to further rotate so as to index the respective intermediate container IC to a fourth material application station 971 or fourth adhesive application station 971. The fourth adhesive application station 971 can include a fourth material applicator or fourth adhesive applicator 972 that applies the fourth layer of glue beads 973 that form the spacers 29 of the containers 305. The fourth adhesive applicator 972 can have the same general configuration of the adhesive applicators 861, 871, 961 described above, e.g., so as to have the configuration and arrangement of adhesive applicator members 862 described above.

As with the third adhesive applicator 961, the mandrel 957 about which the respective intermediate container IC is disposed can be driven to rotate so that the fourth adhesive applicator 972 applies the fourth layer of glue beads 973 in a 360 degree pattern around the respective intermediate container IC. In the illustrated embodiment, the fourth layer of glue beads 973 are applied on top of the second layer of glue beads 963 after the third layer has been aged and cooled.

After the fourth glue beads 973 are applied, the turret assembly 955 rotates to move the respective intermediate container IC to an overwrap station 981 (FIG. 21) that applies an overwrap layer OW to the intermediate cup IC having the four layers of adhesive 863, 873, 963, 973 to form the finished containers 305 with the outer sleeve 23, 123 corresponding to the overwrap layer OW.

The overwrap station 981 can receive overwrap blanks 983 (FIG. 14) and form the overwrap layer OW by adhesively securing the overwrap blank 983 to the intermediate container IC having the four layers of adhesive 863, 873, 963, 973. The overwrap layer OW can be applied to the fourth layer of adhesive 973 after the fourth layer of adhesive has been aged between approximately 0.2 seconds and approximately 12 seconds, but this time may vary outside of this range without departing from the disclosure. Alternatively, the outer sleeve forming machine 950 could include a fourth cooling station without departing from the disclosure.

Further, the fourth adhesive application station 971 could be omitted from the outer sleeve forming machine 950 so that the finished container produced from the outer sleeve forming machine corresponds to the container 205 having spacers with three layers of adhesive 863, 873, 963 without departing from the disclosure.

In the illustrated embodiment, the turret body 956 can be driven to further rotate so as to index to a discharge station 985 that discharges the finished container 205, 305 to a product handling machine 991 that prepares the finished containers 205, 305 for shipment such as by stacking in appropriate quantities and packaging for shipment.

The system 700 could have other machines and process for forming the containers 5, 105, 205, 305 without departing from the disclosure. Further, the intermediate container forming machine 850 could be alternative constructed. For example, the intermediate container forming machine 850 could have more or less than two adhesive application stations or more or less than two adhesive cooling stations without departing from the disclosure. Further, the outer sleeve attachment machine 950 could have more or less than two adhesive application stations or more or less than one adhesive cooling station without departing from the disclosure. Any of the features of the system 700 could be alternatively, shaped arranged, configured, or omitted without departing from the disclosure.

The containers and/or the blanks that form the containers according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blank. In accordance with the above-described embodiments, the blanks may be constructed of paperboard of a caliper such that it is heavier and more rigid than ordinary paper. The blanks can also be constructed of other materials, such as cardboard, hard paper, or any other material having properties suitable for enabling the container to function at least generally as described herein. The blanks can also be laminated or coated with one or more sheet-like materials at selected panels or panel sections.

The above embodiments may be described as having one or more portions adhered together by glue during erection of the container embodiments. The term "glue" is intended to encompass all manner of adhesives commonly used to secure containers in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of forming a container for containing a cold fluid, comprising;

obtaining a base container having an inner sidewall and a bottom secured to the inner sidewall, the inner sidewall extending at least partially around an interior that defines an interior volume of the container;

forming a plurality of annular bands on the inner sidewall of the base container; the forming the plurality of annular bands comprises applying a first layer of material to the inner sidewall and a second layer of material to the first layer of material;

obtaining an outer sleeve;

attaching the outer sleeve to the inner sidewall to form a sidewall construct of the container with insulating features defined between the inner sidewall and the outer sleeve, the attaching the outer sleeve comprises pressing the outer sleeve against the plurality of annular bands to adhesively secure the outer sleeve to the inner sidewall, the insulating features comprise a cavity between the inner sidewall and the outer sleeve, the plurality of annular bands, and a plurality of pockets in the cavity formed between adjacent annular bands, the insulating features are for maintaining a desired temperature of the cold fluid in the interior volume of the container.

2. The method of claim 1, further comprising applying air to the plurality of annular bands with an air applicator to cool at least one annular band of the plurality of annular bands.

3. The method of claim 2, wherein the forming a plurality of annular bands on the inner sidewall of the base container further comprises applying a third layer of material to the second layer of material.

4. The method of claim 3, wherein the forming a plurality of annular bands on the inner sidewall of the base container further comprises applying a fourth later of material to the third layer of material.

5. The method of claim 4, wherein at least one annular band of the plurality of annular bands has a width between about 80 mils and about 120 mils.

6. A system for forming a container for containing a cold fluid, comprising:

a base container forming machine for forming a base container having an inner sidewall, a bottom secured to the inner sidewall, the inner sidewall extends at least partially around an interior that defines an interior volume of the container;

an intermediate container forming machine for receiving the base container from the base container forming machine and forming an intermediate container, the intermediate container forming machine has a first material applicator for applying a first layer of material to the inner sidewall of the base container and a second material applicator for applying a second layer of material to the first layer of material to form a plurality of annular bands on the inner sidewall of the base container, the intermediate container comprises the first layer of material and second layer of material applied to the base container; and an outer sleeve attachment machine for receiving the intermediate container and attaching an outer sleeve to the intermediate container.

7. The system of claim 6, wherein the intermediate container forming machine comprises a turret assembly, the turret assembly comprising a turret body supporting a plurality of mandrels extending therefrom, a respective mandrel of the plurality of mandrels for being at least partially inserted into the interior volume of the base container.

8. The system of claim 7, wherein the turret body is rotatable to move the base container supported on the respective mandrel in a rotational machine direction from the first material applicator to the second material applicator.

9. The system of claim 8, wherein the intermediate container forming machine comprises an air applicator for applying air to the plurality of annular bands to cool at least one annular band of the plurality of annular bands.

10. The system of claim 9, wherein the outer sleeve attachment machine comprises a third material applicator for applying a third layer of material to the second layer of material of the intermediate container.

11. The system of claim 10, wherein the outer sleeve attachment machine is configured to attach the outer sleeve to the third layer of material.

12. The system of claim 11, wherein the outer sleeve attachment machine comprises a fourth material applicator for applying a fourth layer of material to the third layer of material of the intermediate container.

13. The system of claim 12, wherein the outer sleeve attachment machine is configured to attach the outer sleeve to the fourth layer of material.

14. The system of claim 13, wherein the outer sleeve attachment machine comprises an air applicator for applying air to the plurality of annular bands to cool at least one annular band of the plurality of annular bands.

15. In a system for forming a container for containing a cold fluid, an intermediate container forming machine for receiving a base container from a base container forming machine, the base container having an inner sidewall, a bottom secured to the inner sidewall, the inner sidewall extends at least partially around an interior that defines an interior volume of the container, the intermediate container forming machine being for forming an intermediate container and discharging the intermediate container to an outer sleeve forming machine, the intermediate container forming machine comprising:

a turret assembly for receiving the base container and moving the base container within the intermediate container forming machine, a first material applicator for applying a first layer of material to the inner sidewall of the base container, and a second material applicator for applying a second layer of material to the first layer of material, a discharge station for discharging the intermediate container to an outer sleeve attachment machine, the intermediate container comprises the first layer of material and second layer of material applied to the base container to form a plurality of annular bands on the inner sidewall of the base container.

16. The intermediate container forming machine of claim 15, in combination with an outer sleeve attachment machine, the outer sleeve attachment machine comprises:

a turret assembly for receiving the intermediate container and moving the intermediate container within the outer sleeve attachment machine, a third material applicator for applying a third layer of material to the second layer of material.

17. The combination of claim 16, wherein the outer sleeve attachment machine further comprises an overwrap station for applying an outer sleeve to the third layer of material.

18. The combination of claim 17, wherein the outer sleeve attachment machine further comprises a fourth material applicator for applying a fourth layer of material to the third layer of material.

19. The combination of claim 18, wherein the intermediate container forming machine comprises an air applicator for applying air to the plurality of annular bands to cool at least one annular band of the plurality of annular bands.

20. The combination of claim 19, wherein the outer sleeve attachment machine comprises an air applicator for applying air to the plurality of annular bands to cool at least one annular band of the plurality of annular bands.

* * * * *